June 8, 1965 A. J. STOCK 3,187,944
GRAVIMETRIC FEEDER AND METHOD OF FILLING VOIDS THEREIN OR IN OTHER PRESSURE VESSELS
Filed Oct. 9, 1962 14 Sheets-Sheet 1
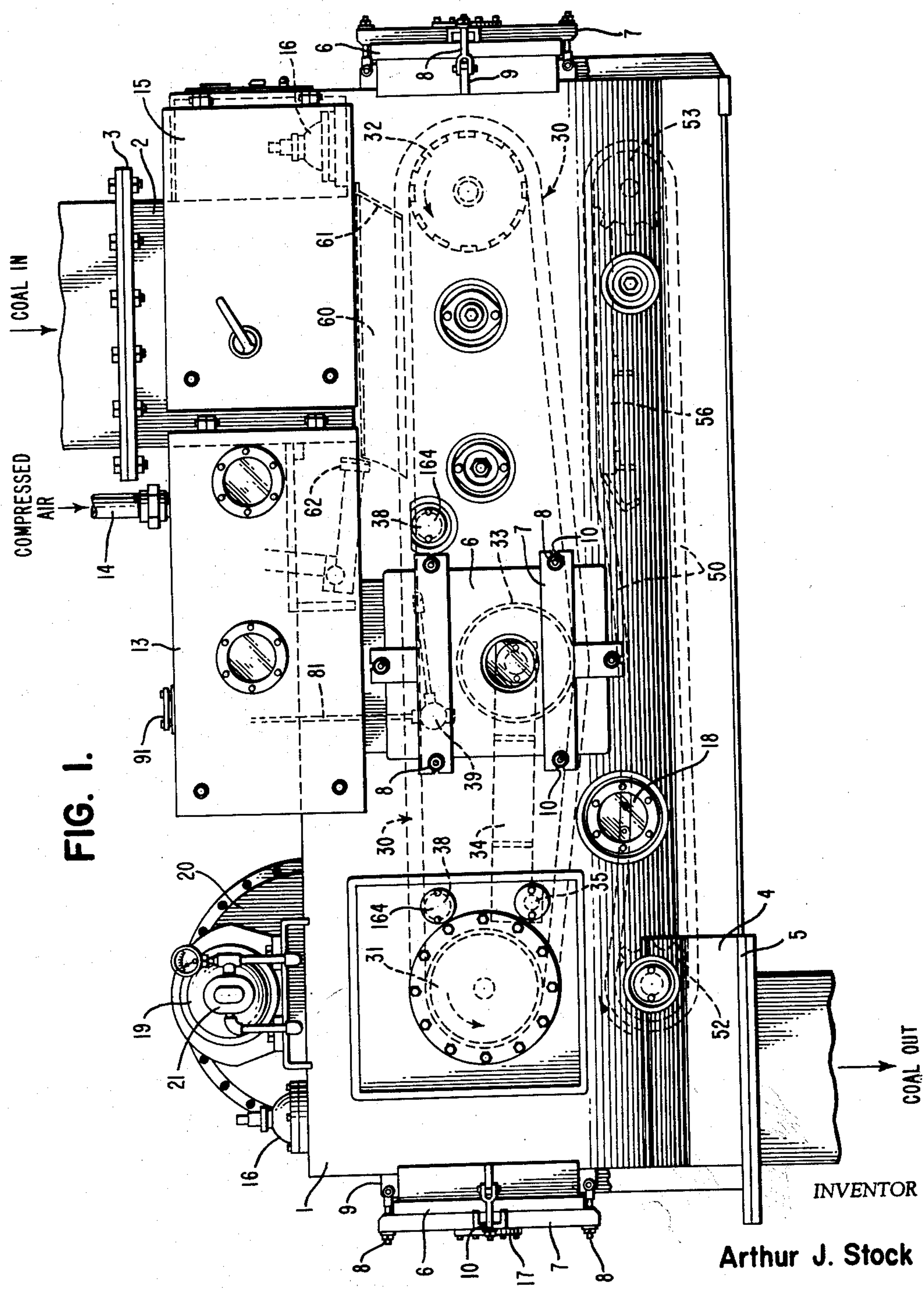
INVENTOR
Arthur J. Stock
BY Stevens, Davis, Miller & Mosher
ATTORNEYS

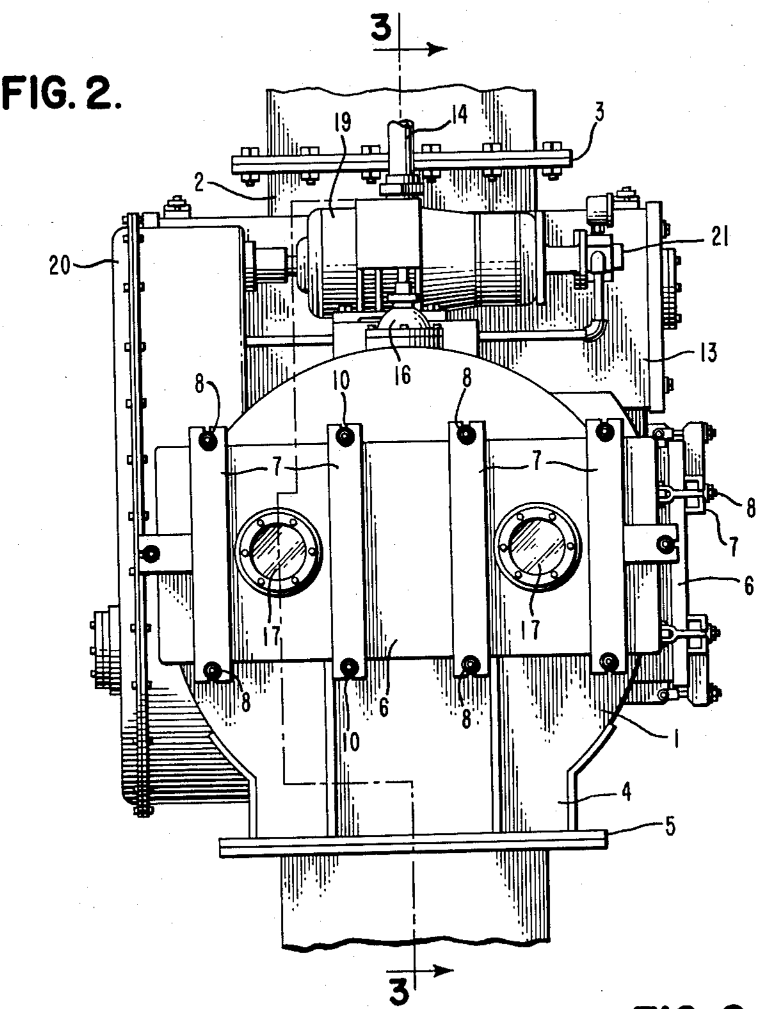
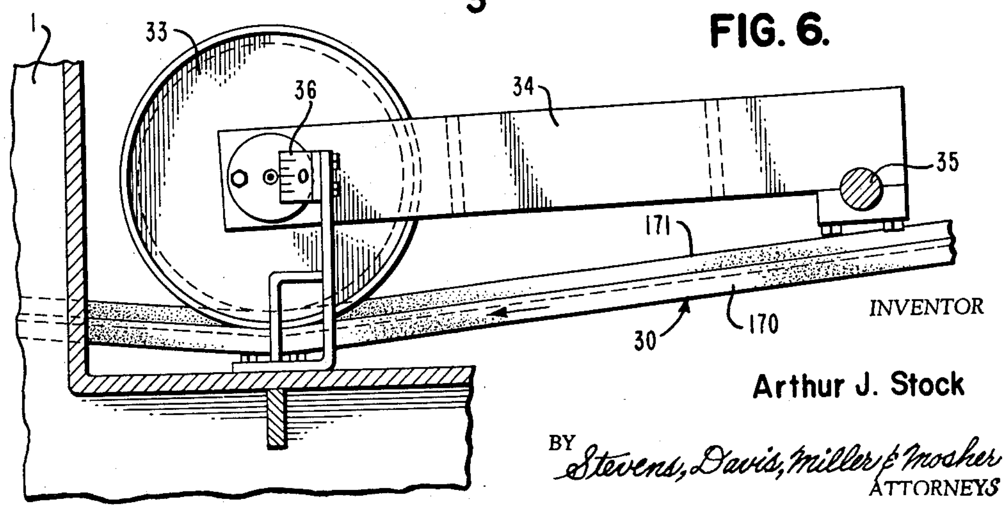
INVENTOR
Arthur J. Stock
BY Stevens, Davis, Miller & Mosher
ATTORNEYS

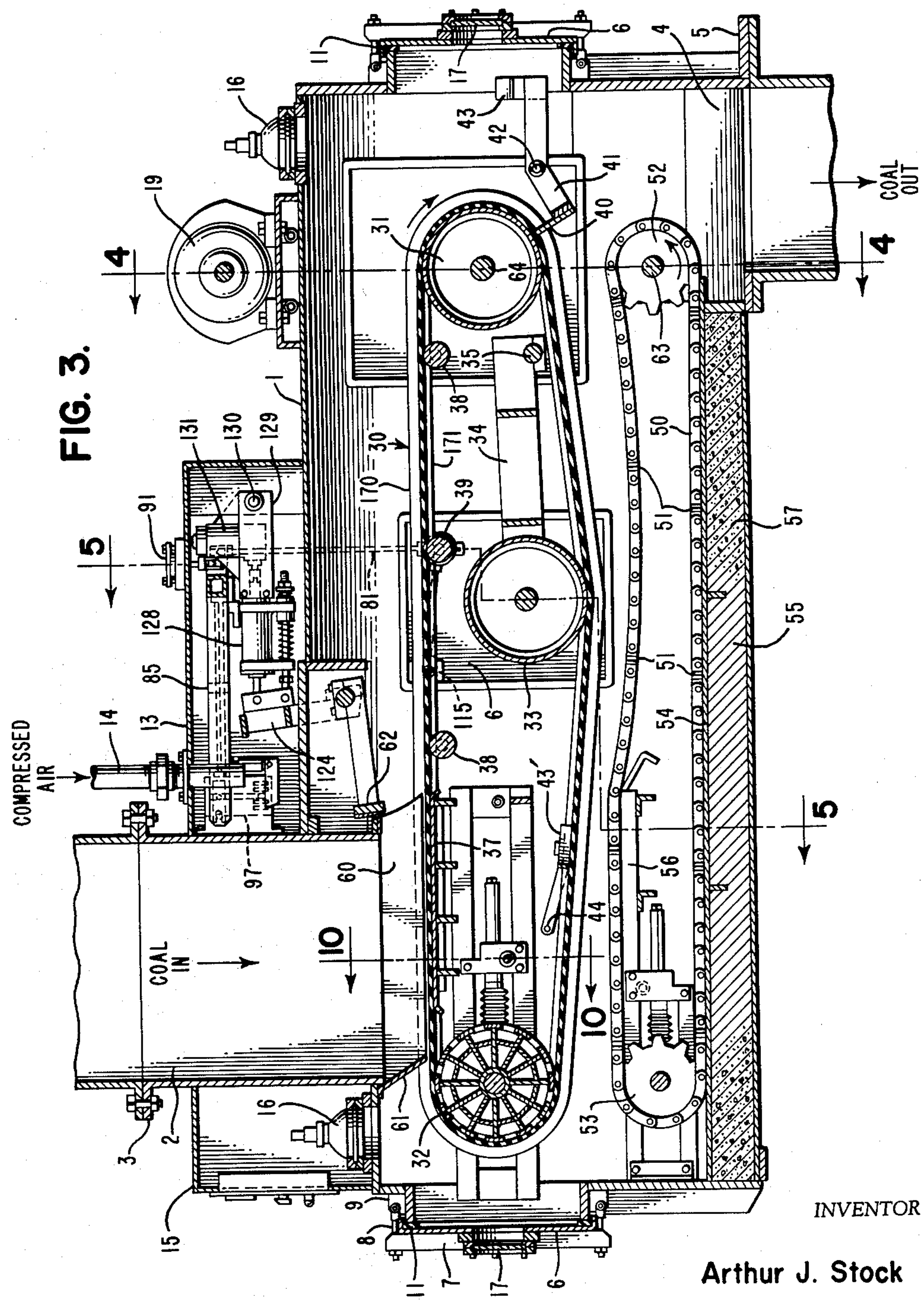
INVENTOR
Arthur J. Stock
BY *Stevens, Davis, Miller & Mosher*
ATTORNEYS

INVENTOR

Arthur J. Stock

BY Stevens, Davis, Miller & Mosher
ATTORNEYS

INVENTOR

Arthur J. Stock

BY *Stevens, Davis, Miller & Mosher*
ATTORNEYS

INVENTOR
Arthur J. Stock
BY
Stevens, Davis, Miller & Mosher
ATTORNEYS

INVENTOR
Arthur J. Stock
BY
Stevens, Davis, Miller & Mosher
ATTORNEYS

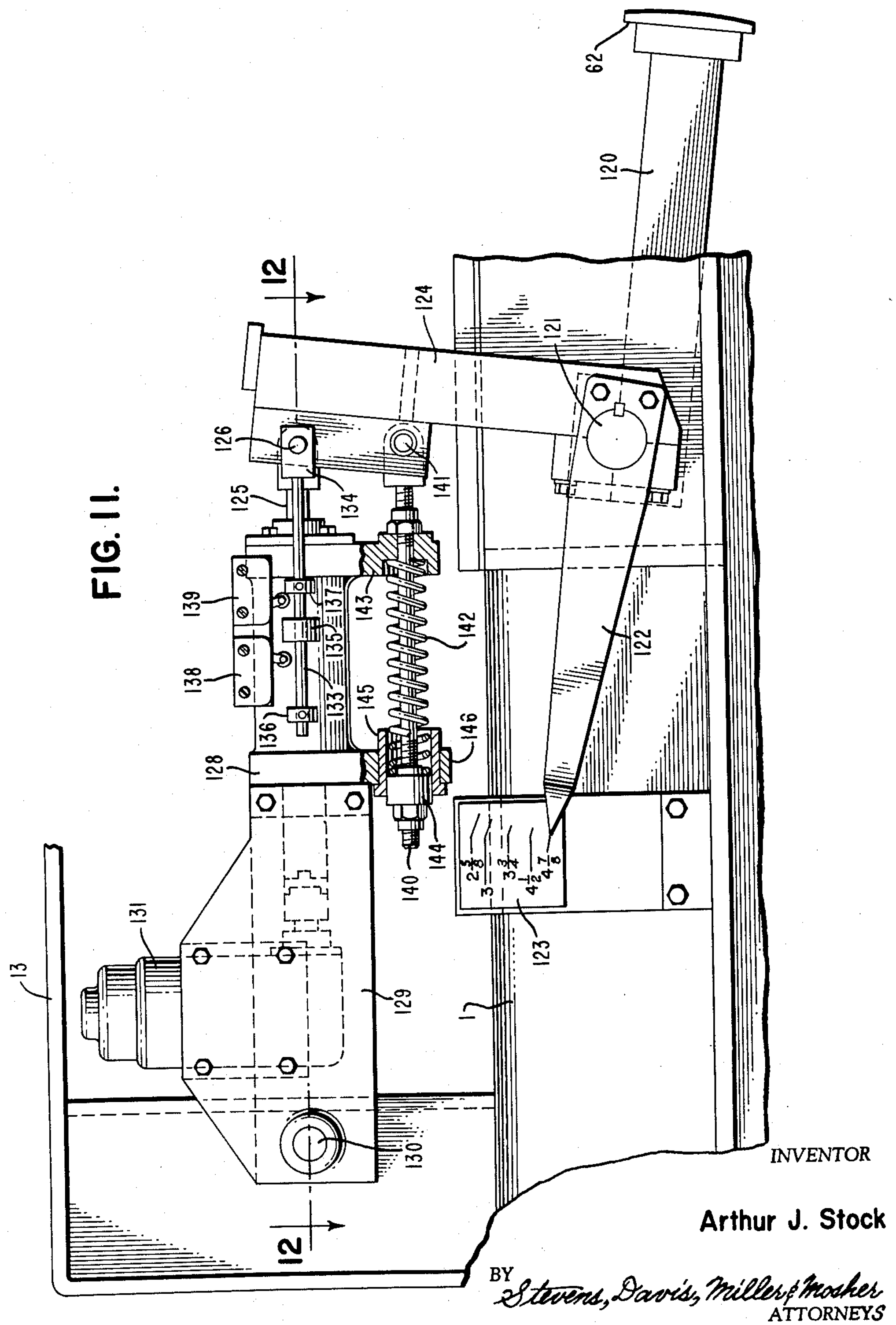
INVENTOR
Arthur J. Stock
BY Stevens, Davis, Miller & Mosher
ATTORNEYS

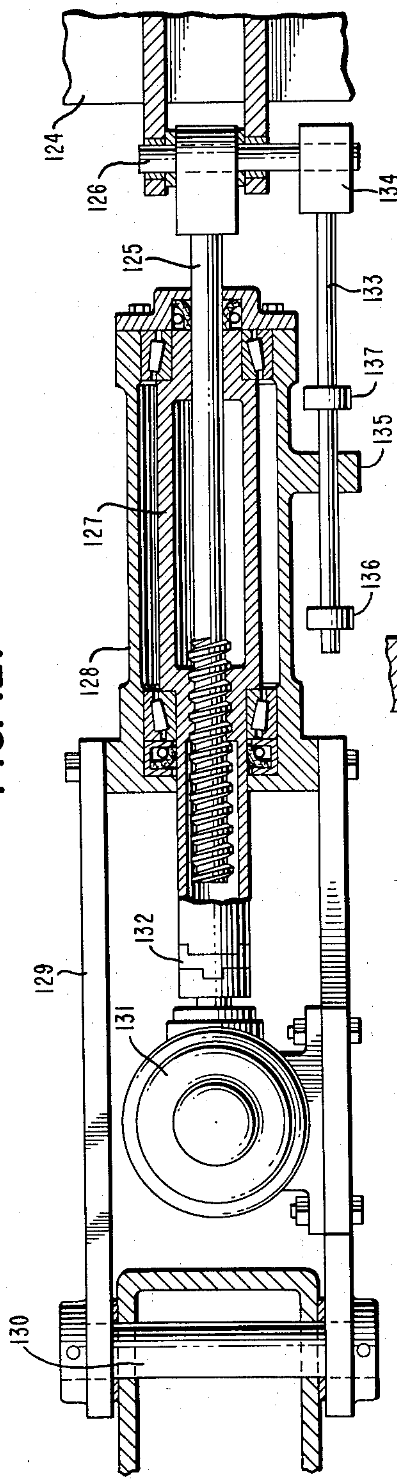
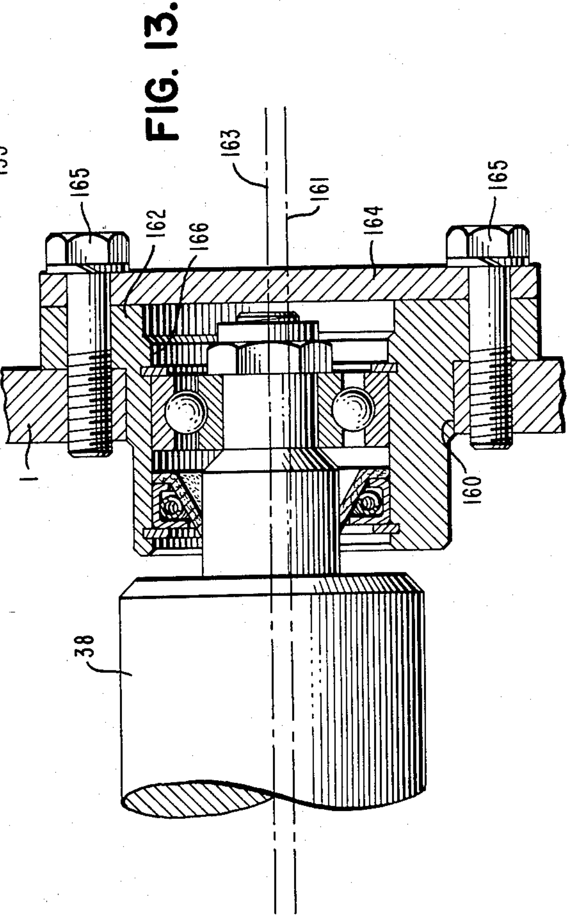
INVENTOR
Arthur J. Stock
BY
Stevens, Davis, Miller & Mosher
ATTORNEYS

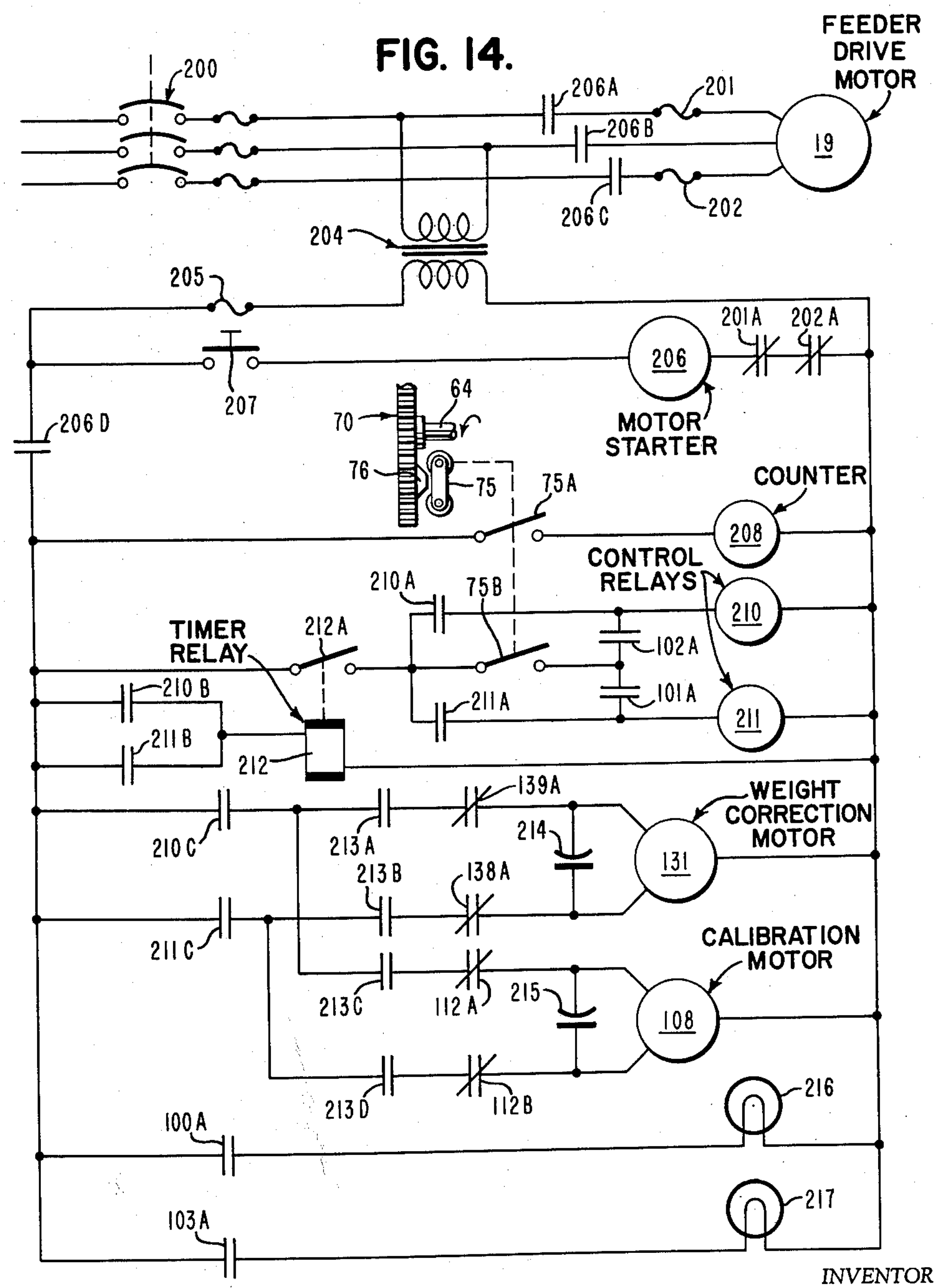
INVENTOR
Arthur J. Stock
BY
Stevens, Davis, Miller & Mosher
ATTORNEYS

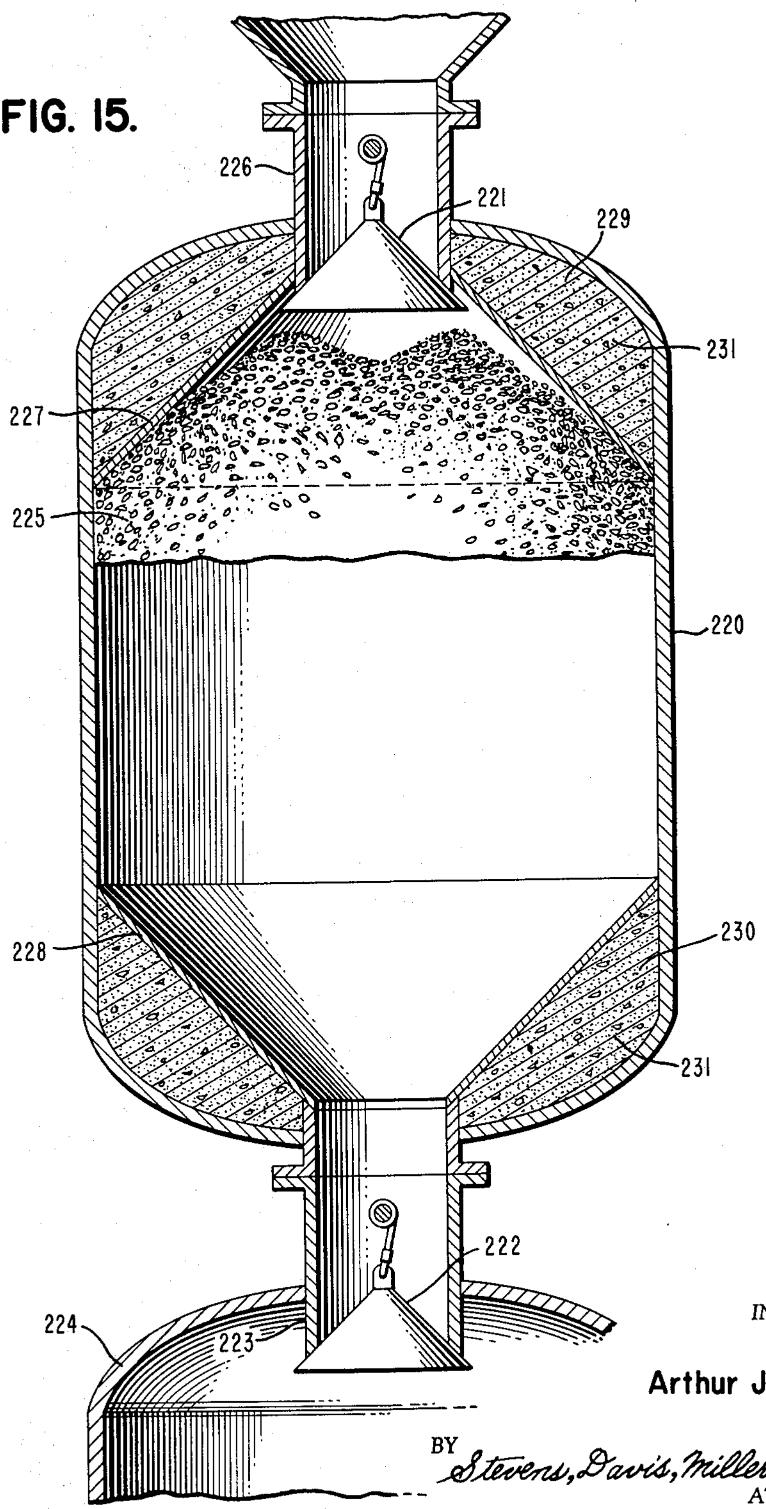
INVENTOR
Arthur J. Stock
BY
Stevens, Davis, Miller & Mosher
ATTORNEYS

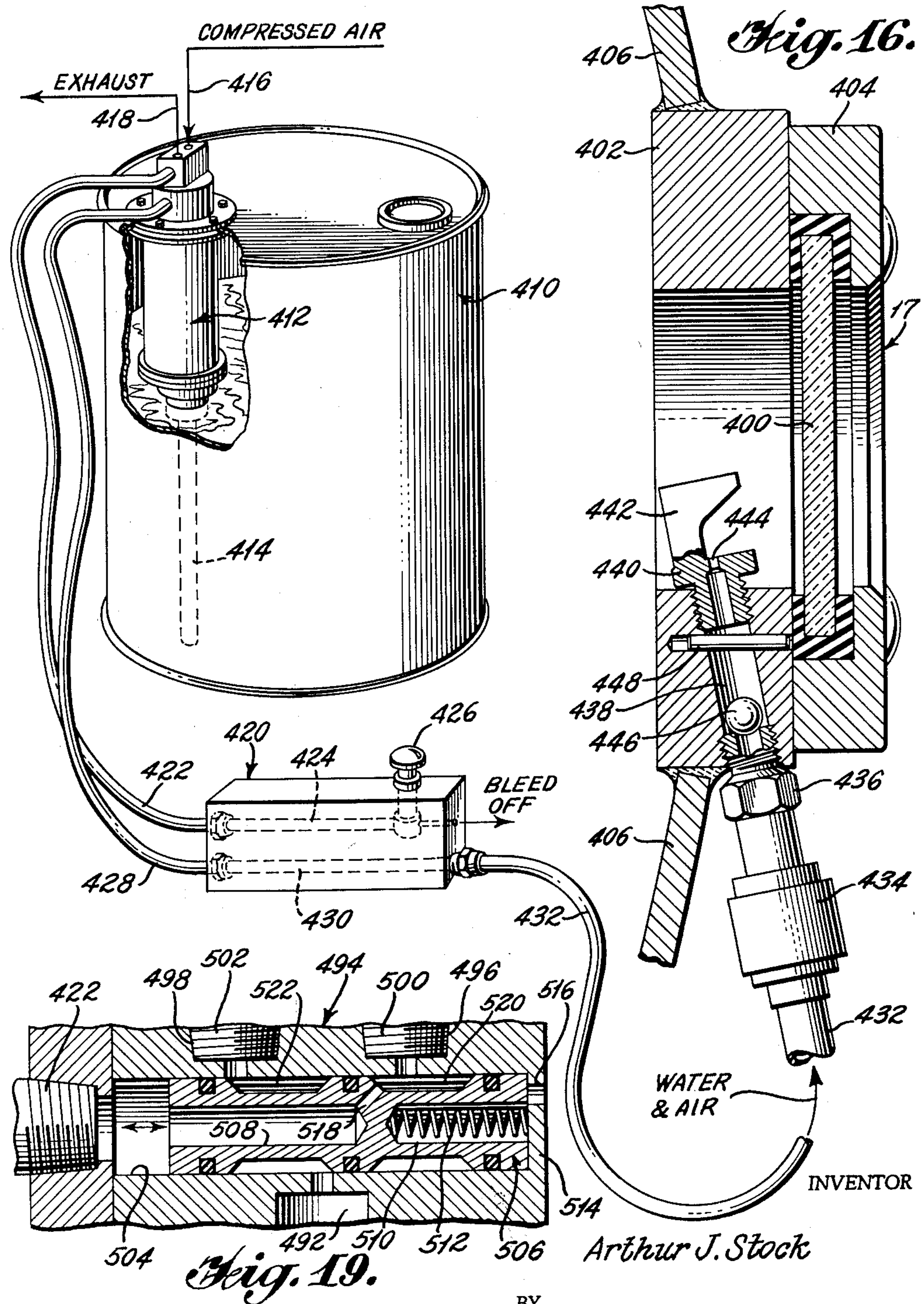
INVENTOR
Arthur J. Stock
BY
Stevens, Davis, Miller & Mosher
ATTORNEYS GRAVIMETRIC FEEDER AND METHOD OF FILLING VOIDS THEREIN OR IN OTHER PRESSURE VESSELS
Filed Oct. 9, 1962 14 Sheets-Sheet 14
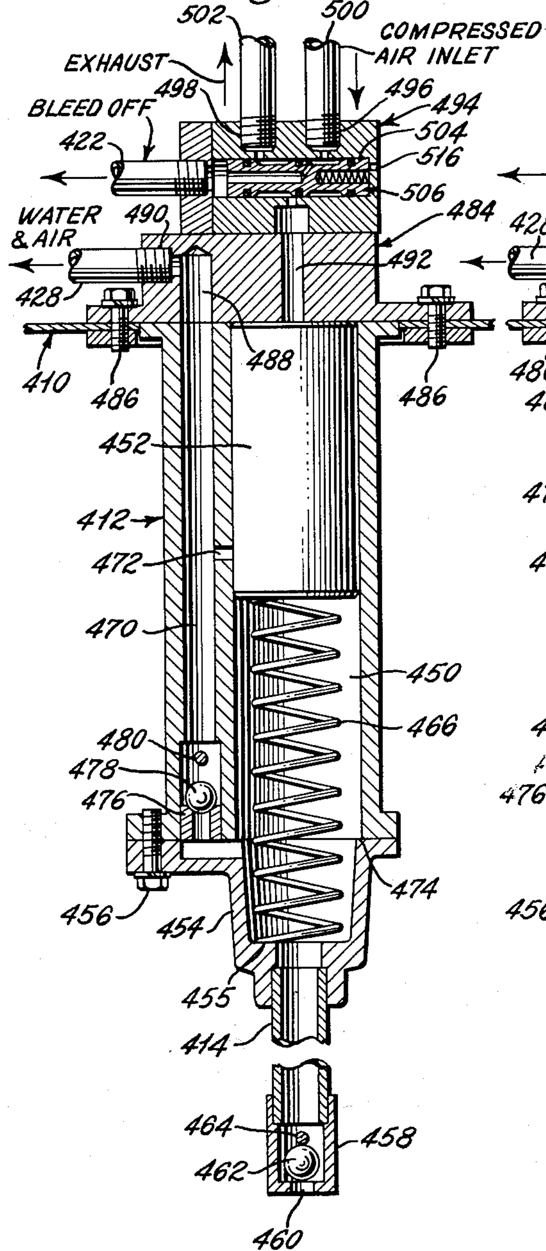
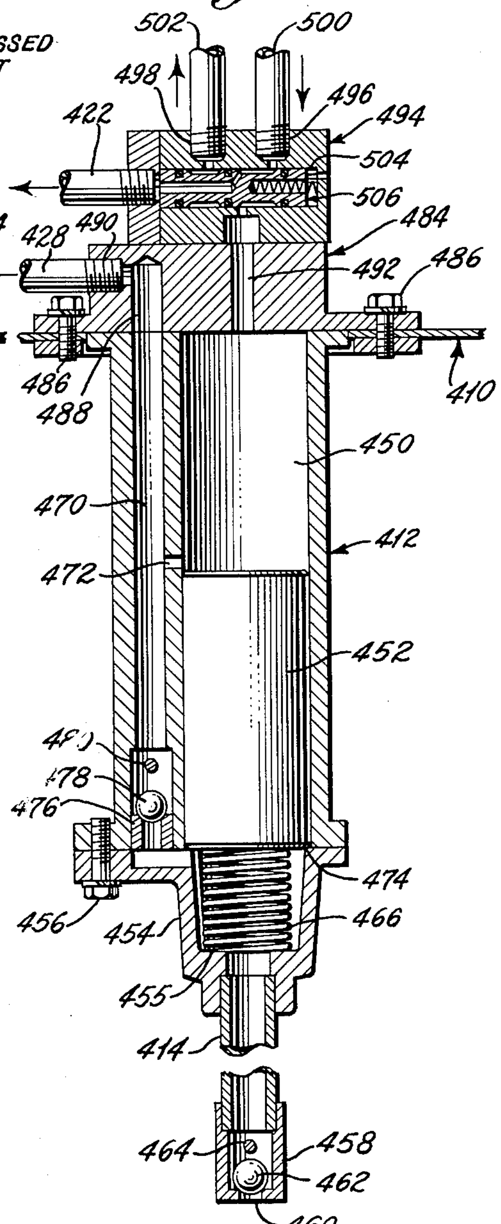
INVENTOR
Arthur J. Stock
BY
Stevens, Davis, Miller & Mosher
ATTORNEYS United States Patent Office 3,187,944
Patented June 8, 1965

3,187,944

GRAVIMETRIC FEEDER AND METHOD OF FILLING VOIDS THEREIN OR IN OTHER PRESSURE VESSELS

Arthur J. Stock, 745 Hanna Bldg., Lakewood, Ohio
Filed Oct. 9, 1962, Ser. No. 229,785
27 Claims. (Cl. 222—25)

This invention relates to certain improvements in gravimetric feeders. This application is a continuation-in-part of my copending application Serial No. 22,217, filed April 14, 1960, now abandoned.

A feeder may be defined as a device which takes solid, pulverulent material from a bunker, hopper or bin, said material being in what might be termed a continuous mass or column, and delivers said material at a controlled rate as free falling or separately flowing particles. A gravimetric feeder, then, is a feeder whose rate of discharge is controllable in terms of the weight of the material being discharged. In addition, the gravimetric feeder, which forms the subject of this invention, can readily be equipped to provide an indication of the total weight of the material fed during a given period of time. Although this invention is particularly adapted to feed coal to pulverizers or cyclone burners of large boiler installations, the structures disclosed herein are useful in the feeding of particulate material in general. Terms specific to coal will be used in the following description, but there is no intention that the basic concepts of the invention be restricted to such application.

This invention also relates to a method of filling a void in a pressure vessel such as the gravimetric feeder herein described. Although the operating pressure within the feeder may generally be atmospheric, or slightly above or below atmospheric, nevertheless, certain installations require pressure operation and therefore, the equipment must be designed as a pressure vessel. For this reason, any voids or pockets within the feeder must be reinforced so as to prevent the collapse of the structure surrounding the voids or pockets to prevent accumulation of material, a great hazard in the event of an explosion. As will hereinafter appear, the present invention also pertains to a novel method of reinforcing the voids in the feeder so that the structure surrounding the void may be made of weaker material than would otherwise be required. This method feature of the present invention may also be employed in connection with other pressure vessels, and, therefore, said feature applies to pressure vessels broadly.

Since the feeder of the present invention is intended to feed coal to a boiler, it should be pointed out that there are two primary coal burning appliances in large boilers today. These are pulverized coal burners and cyclone burners.

The normal operating pressure inside a feeder supplying coal to a pulverizer may be slightly above or below atmospheric. However, the National Fire Protection Association Code No. 60A "Code for the Installation and Operation of Pulverized Coal Systems," stipulates that the feeders shall have housings designed for 50 pounds per square inch static pressure. This requirement is based on the fact that the maximum pressure normally experienced in a coal dust explosion is 50 pounds per square inch. Correspondingly, it is appropriate to enclose the feeder in a cylindrical housing. Specifically, this is the type of gravimetric feeder described herein. However, a rectangular housing could be used for a feeder supplying a pulverizer providing it were adequately reinforced.

For cyclone burners, the current practice is to operate with the feeder at 1 pound per square inch above atmospheric. This pressure may increase to 2 pounds per square inch, and all design work is done correspondingly. Because the coal fed to cyclone burners is only crushed and not pulverized, there is no 50 pounds per square inch explosion pressure requirement. A rectangular housing is very suitable, but nevertheless it must be pressure tight and, correspondingly, there is no access to the feeder proper while in operation.

One purpose of this invention is to provide a gravimetric feeder which, as compared with prior art feeders, will operate more accurately, both insofar as the instantaneous feed rate and the total weight during a given period of time are concerned.

Another purpose is to provide a feeder which will operate more reliably.

A further purpose is to provide a feeder capable of handling dusty or sticky materials and which will operate accurately and reliably when enclosed in a dust tight housing which may be under a positive or negative internal pressure.

A further purpose is to provide a feeder which will operate accurately and reliably over extended periods of many months but which will require a minimum of adjustments to be made, any required adjustments being possible from outside the housing.

A further purpose is to provide a feeder whose operation is basically simple so that any necessary maintenance can be performed readily.

A further purpose is to provide a feeder whose components are sufficiently rugged that the feeder will operate accurately and reliably in spite of considerable vibration, such as is present in power generating stations.

A further fundamental purpose is to provide a gravimetric feeder which can be calibrated readily using standard test weights.

Another purpose is to provide a feeder which inherently provides accurate control of feed rate by weight without the necessity of applying a calibration factor determined by experiment.

A further purpose of the present invention is to provide a method of filling a void in the gravimetric feeder in such a manner as to obviate the necessity for using a high-strength structure as an enclosure for the void.

A further purpose of the present invention is to employ the method referred to above for filling the voids in pressure vessels broadly.

A further object of the invention is to provide a novel window cleaning apparatus and method whereby bull's eyes in the feeder can be cleaned from the inside so that internal parts of the feeder can be observed.

Other and further objects and advantageous features of the present invention will hereinafter more fully appear in connection with a detailed description of the drawings in which:

FIGURE 1 is a side elevation of the gravimetric feeder of the present invention as adapted for feeding coal to pulverizers, with certain hidden parts shown in dotted lines;

FIGURE 2 is a lefthand end elevation of the structure shown in FIGURE 1;

FIGURE 3 is a longitudinal cross section taken along section line 3—3 of FIGURE 2;

FIGURE 6 is a fragmentary side elevation, with some parts in section, showing details of the tension roller, as viewed along line 6—6 of FIGURE 5;

FIGURE 11 is a vertical elevation of the leveling bar actuating mechanism, taken from the opposite viewpoint as FIGURE 3 and on a larger scale with certain parts broken away to show the internal details;

FIGURE 12 is a horizontal cross section taken along section line 12—12 of FIGURE 11;

FIGURE 13 is a horizontal cross section of the bearing support for the weigh span roller;

FIGURE 14 is a schematic wiring diagram for the gravimetric feeder;

FIGURE 15 is a vertical cross section through another pressure vessel; particularly an air lock with bell-type valves at the top and bottom, showing the method of filling voids in the pressure vessel;

FIGURE 16 is a pictorial view partly in section illustrating the apparatus and method for cleaning the inside of a bull's eye;

FIGURES 17 and 18 are vertical sections through the pump housing of the apparatus portrayed in FIGURE 16; and FIGURE 19 is an enlargement of a fragment of the pump housing shown in FIGURES 17 and 18.

Figure 4:
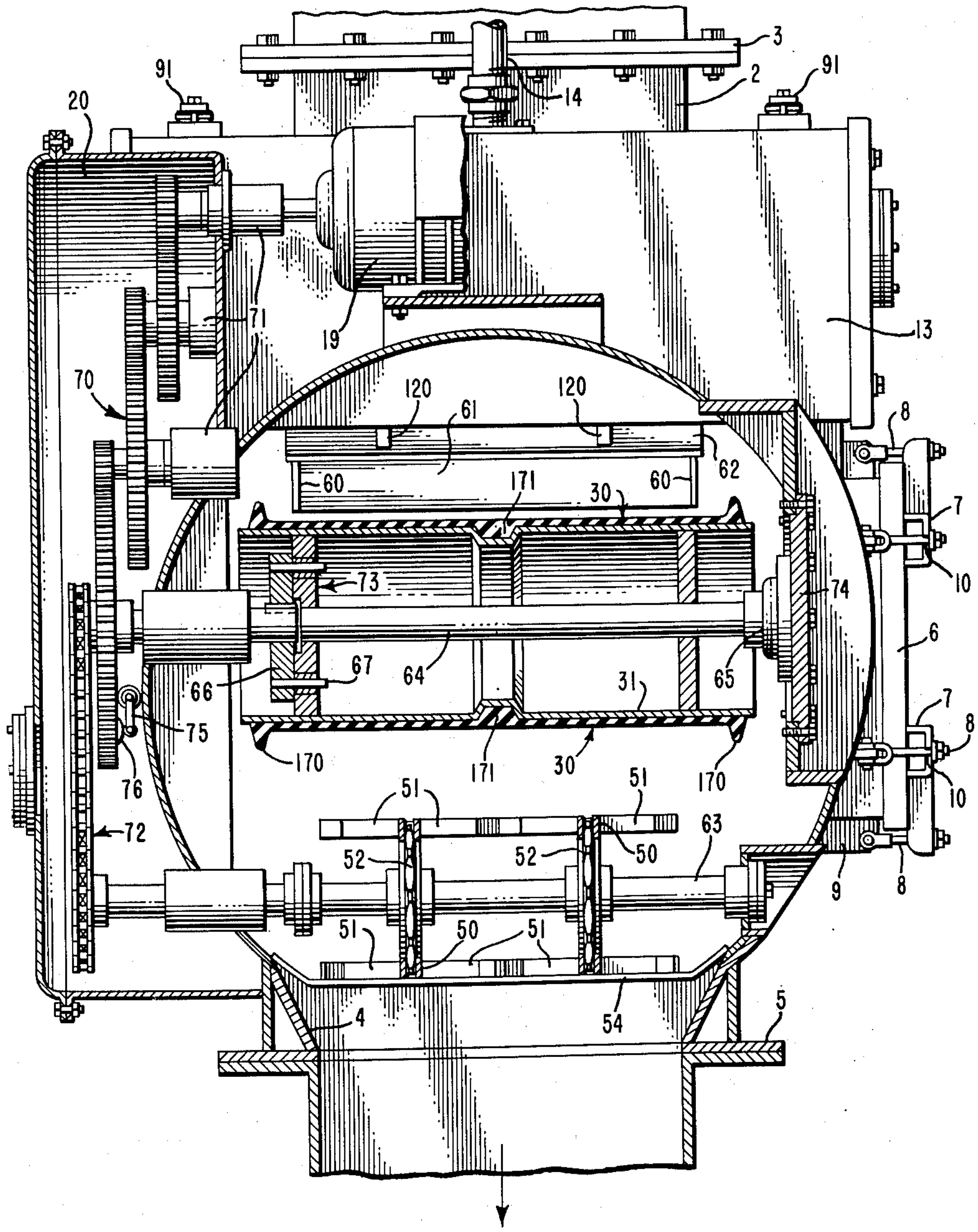
FIGURE 4 is a transverse cross section taken along section line 4—4 of FIGURE 3.

Referring to the drawings in detail, in FIGURES 1 and 2, the housing 1 is cylindrical, suitable for use in feeding pulverizers. The coal inlet 2 penetrates the housing, as will be shown in greater detail later, and is provided with a flange 3 at its upper end for bolted connection to the bunker or down spout from the bunker above. The discharge of coal from the feeder is through an opening 4 in the base of the housing, which is provided with a flange 5 for attaching the connection pipe to the pulverizer.

As a matter of terminology, the end of the feeder having the inlet is known variously as the inlet end, take-up end, or front end. The expression "take-up end" is used because the take-up adjustment for the feeder belt is located at this end. It is also termed the front end because this end of the unit is towards the front when an observer is looking at the boiler and the feeder is in its most usual position with respect to the boiler. The other end of the feeder is known variously as the discharge end, head end or rear end. The expression "head end" refers to the fact that the majority of driving equipment is located at this end.

Visible in FIGURES 1 and 2 are various access doors 6, which are reinforced with channels 7 over their outside surfaces. These access doors are mounted on the feeder by means of clevis bolts 8 which are pivotally mounted on lugs 9 permanently fixed to the feeder frame and which slide into slots 10 in the access door reinforcing channels. The doors are made dust tight by means of a heavy gasket 11, which is suitably held against the inside edge of the door (see FIGURE 3).

Returning to FIGURES 1 and 2, a pressurized compartment 13 straddles the stop of housing 1 near inlet 2 and houses the weighing mechanism and leveling bar actuating mechanism as will be described below. This compartment is provided with an air connection 14 so that it can be maintained at an internal pressure above that within the housing 1 using clean, dust-free air.

Also straddling the housing 1 on each side of the inlet 2 is an electrical compartment 15 which serves to provide an enclosure for the various electrical components.

Mounted on the housing are lights 16, one of which is visible in FIGURE 1 and both of which may be seen in FIGURE 3. Bull's eyes 17, permit the visual inspection of the interior during operation using the illumination provided by lights 16. An additional bull's eye 18 permits inspection of the clean-out conveyor, using illumination provided by a light source on the far side of the feeder as viewed in FIGURE 1, this light source not being shown in any of the figures.

Power for driving the feeder is provided by adjustable speed motor 19 which drives the various components through gear box 20. An oil pump 21 is also directly connected to motor 19 to provide lubrication for the various bearings in gear box 20.

The coal is transported from the inlet 2 to the discharge 4 through the feeder by means of feeder belt 30 (see FIGURE 3). This is supported at the discharge end by head pulley 31, which also serves as the drive pulley. The tail pulley 32 is of the self-cleaning type. Feeder belt 30 is maintained at a fairly high tension by means of tension roller 33, whose weight is supported on the return run of the belt. (The direction of belt travel is indicated by the arrow.) Tension roller 33 is rotatably mounted at one end of arm 34, such an arm being provided at each end of the tension roller, that is, on each side of the machine. Arm 34 in turn is pivotally mounted at 35 relative to housing 1. A small scale 36 is fixed to the housing (see FIGURE 6), so that deviations in the height of the tension roller above or below normal can be seen through a bull's eye in the door over the end of the tension roller. The tension in belt 30 is controlled by taking up on the take-up pulley in a manner to be described, until the tension roller is in its normal position. Because the weight of this roller is constant and because the deflections from horizontal with which the belt approaches and leaves the tension roller are substantially constant, the tension in the belt will have a definite value, if the tension roller is in its central location.

The belt 30 is supported directly below inlet 2 by skid plate 37. It is further supported by two weigh span rollers 38, 38, which define the length of the weigh span. The belt is still further supported by weighing roller 39, the weight upon which is transferred in a manner to be described to the weighing mechanism.

The outside surface of belt 30 is scraped clean of coal at a point below the head pulley 31 by belt scraper 40. Belt scraper 40 is carried on two arms 41, one on each side of the machine, which are pivotally supported at 42. Counterweights 43, one on each arm 41, keep the belt scraper in contact with the belt.

The inside surface of the belt is scraped free of any dust which may have settled on it during the return run by a plow shaped belt scraper 43′ located immediately prior to the tail pulley 32. Belt scraper 43′ is pivotally supported at 44.

Because it is possible for appreciable amounts of dust to collect on the bottom of the feeder housing during the course of several months, it is frequently desirable to incorporate a clean-out conveyor in the bottom. This comprises two chains 50, with flights 51 projecting to either side (see FIGURE 4). The chains are carried on the clean-out conveyor head sprocket 52 and clean-out conveyor tail sprocket 53. The direction of motion is indicated by the arrow in FIGURE 3 so that the bottom strand moves to remove any dust from the bottom of the housing interior and empty it into the discharge opening 4.

Figure 5:
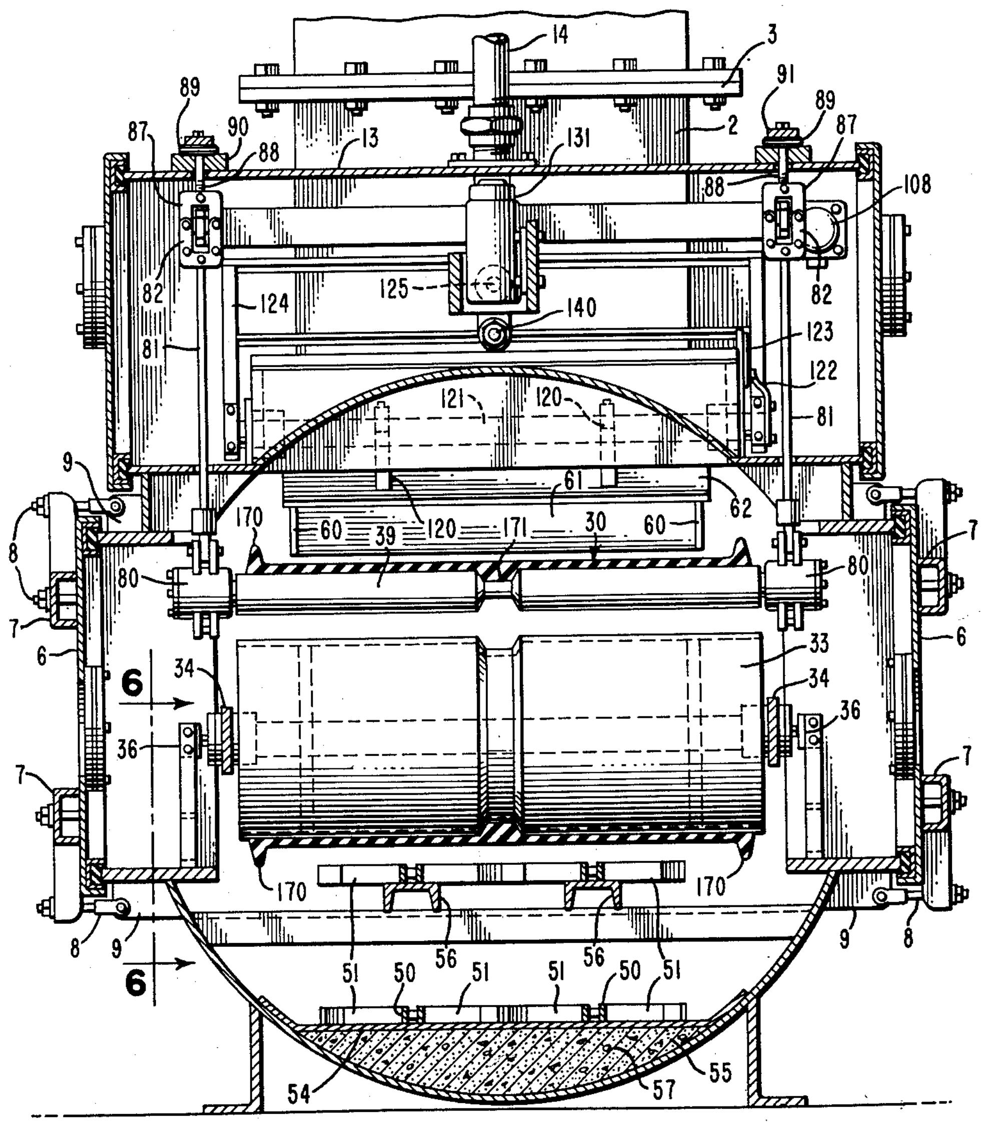
FIGURE 5 is another transverse cross section taken along section line 5—5 of FIGURE 3.

The lower run of the clean-out conveyor allows the chain to ride upon a flat trough 54, shown also in FIGURES 4 and 5. The flat surface is required to provide effective cleaning action. The space 55 between the flat trough and the cylindrical housing 1 is filled with concrete 57 in accordance with one of the features of the present invention. By filling this space with concrete, it is not necessary for the trough 54 to be as strong as it would have to be if it were part of the pressure vessel. The upper, return run of the clean-out conveyor chain is partially freely hanging and partially supported on channels 56 near the take-up end.

Coal is directed onto the feeder belt 30 from the inlet 2 by means of the front skirt plate 61 and by side plates 60. The depth of the coal stream upon the belt is regulated by an adjustable leveling bar 62, whose actuation will be discussed below. It will be noted that side plates 60 do not continue over the weighing span of the feeder belt between weigh span rollers 38 and 38, since to do so might cause inaccuracies as a result of the coal rubbing along them. After passing beneath the leveling bar 62, the coal is free to form its own side edges; it is prevented from falling off the edge of the belt in a manner to be described below.

The variable speed motor 19 drives the head pulley 31 through a gear train 70 (see FIGURE 4). The various shafts are suitably journaled in bearings located in housings 71 in the usual fashion, which will not be further described. The clean-out conveyor head shaft 63 is driven through a chain and sprocket arrangement 72 from the feeder head shaft 64. To permit removal of the head pulley 31, the feeder is provided with an opening on one side covered by cover plate 74, this opening being sufficiently large that the head pulley can be passed through it. The cover plate 74 has mounted upon it a bearing 65 for the head pulley drive shaft. The coupling 73 serves to locate the other end of the head pulley, to transmit the drive torque to it, and at the same time is readily pulled apart when the head pulley is removed. This coupling is a disc 66 mounted upon the drive shaft with pins 67 projecting horizontally from its surface; these pins fit into bushings which are mounted in holes in the head pulley. Mounted on gear box 20 is an electrical limit switch actuated by arm 75. This arm is contacted by a small cam segment 76 mounted on the gear which drives the head pulley shaft. The cam segment is so shaped that the limit switch, hereinafter known as the pulsor switch, is briefly closed once during each revolution of the head pulley.

FIGURE 5 shows a section through the tension roller 33, the weighing roller 39, with the belt 30 upon it, the backside of the leveling bar 62, the access doors 6 on the side of the feeder, the weigh lever compartment access doors, the weighing roller support rods and weigh lever cross member, the clean-out conveyor, and the trough which forms the bottom of the interior of the feeder. Note that the space 55 between the trough plate and the inside of the cylindrical shell is filled with concrete 57. In FIGURE 4 the section goes through the discharge opening and there is no concrete shown below the trough part of the clean-out conveyor.

Figure 7:
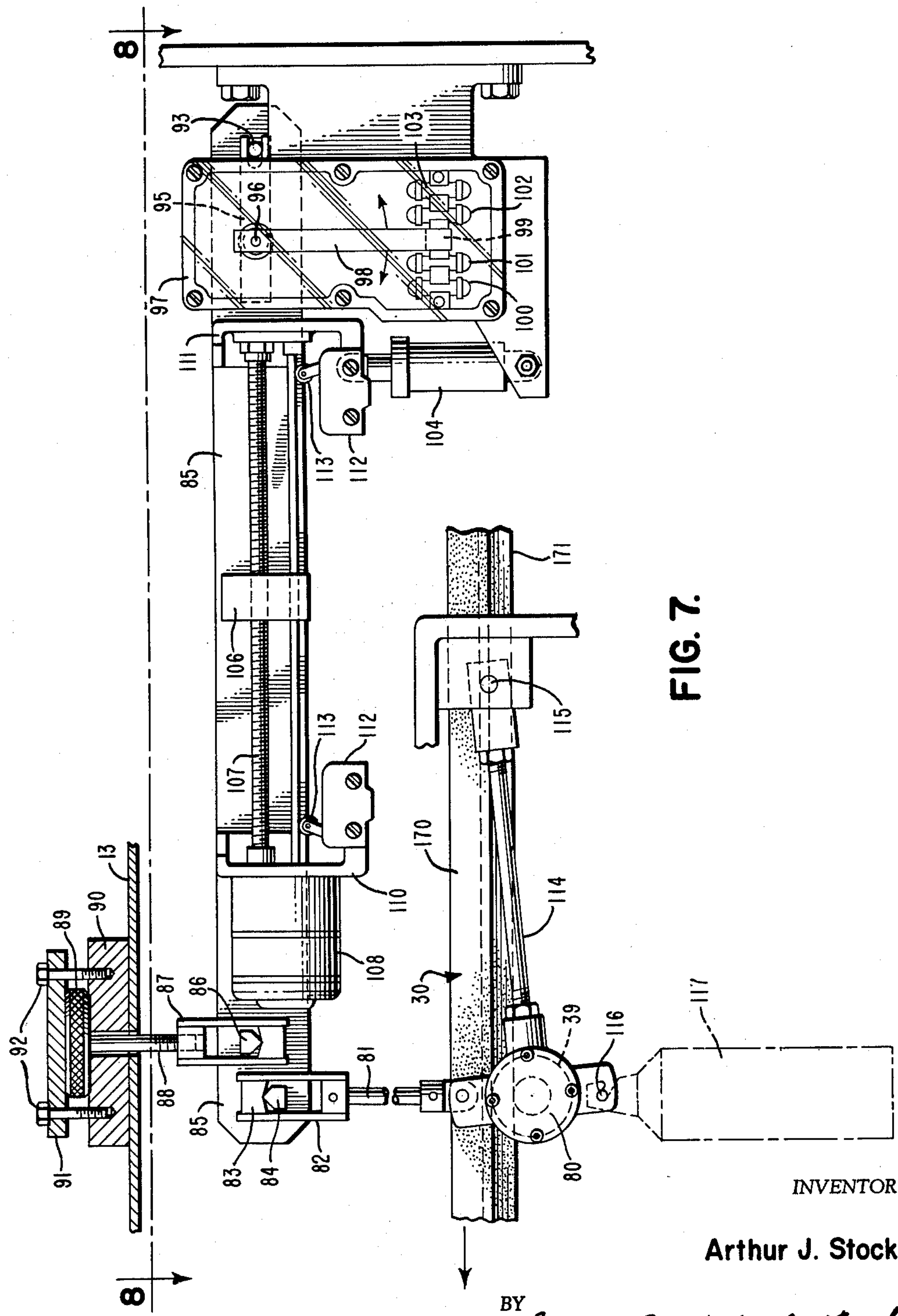
FIGURE 7 is a fragmentary side elevation of the weighing mechanism shown in FIGURE 3, but on a considerably larger scale and viewed from the opposite side.

The weighing roller 39 (see Figures 7 and 8 also) is rotatably mounted at each end in suitable bearing blocks 80. These are carried by weighing roller support rods 81 from loops 82. The upper portion of this loop is a a hardened bearing block 83 which rests freely upon the knife-edge pivot 84. Pivot 84 is affixed to the weigh lever 85. Weigh lever 85 is supported on pivots 86 which are carried in a similar manner to the preceding from loops 87. The height of these loops on each side of the feeder is individually adjustable by means of screw 88, which screws into the upper portion of the loop 87. Each screw 88 is rotated manually by means of a knurled head 89 which rests upon block 90, which in turn is affixed to weigh lever compartment housing 13 and is thus fixed relative to the entire feeder housing. By rotating the knurled heads 89, the two sides of the weigh lever can be raised or lowered, permitting the weighing roller to be brought into a position so that its top edge is exactly in the plane defined by the top edges of the two weigh span rollers 38, 38. Further rotation of the knurled head 89 is prevented by screwing plate 91 down tight upon the top of it by means of screws 92.

At the outer end of weigh lever 85 is fixed a pin 93. Vertical motion of this pin as a result of changes of weight upon the weighing roller causes rotation of arm 95 about pivot shaft 96 mounted in block 97, which is fixed relative to the body of the feeder. This rotation further rotates arm 98 which is keyed to the outer end of shaft 96 and which carries a small permanent magnet 99 at its bottom end. This magnet is arranged to sweep over the magnetically operated mercury switches 100, 101, 102, 103. In particular, when the weight bearing upon weighing roller 39 is extremely light, then the end of the weigh lever 85 which bears the pin 93 is low and magnet 99 is in such a position as to actuate both switches 100, and 101. When the load on weighing roller 39 is somewhat lighter, only switch 101 is actuated. When the weight is correct, none of the switches as actuated. When the load is slightly heavy, switch 102 is closed. When the load is much too heavy, both switches 102 and 103 are actuated. These four switches provide electrical control to other components of the system as will be described below.

Figures 8, 9:
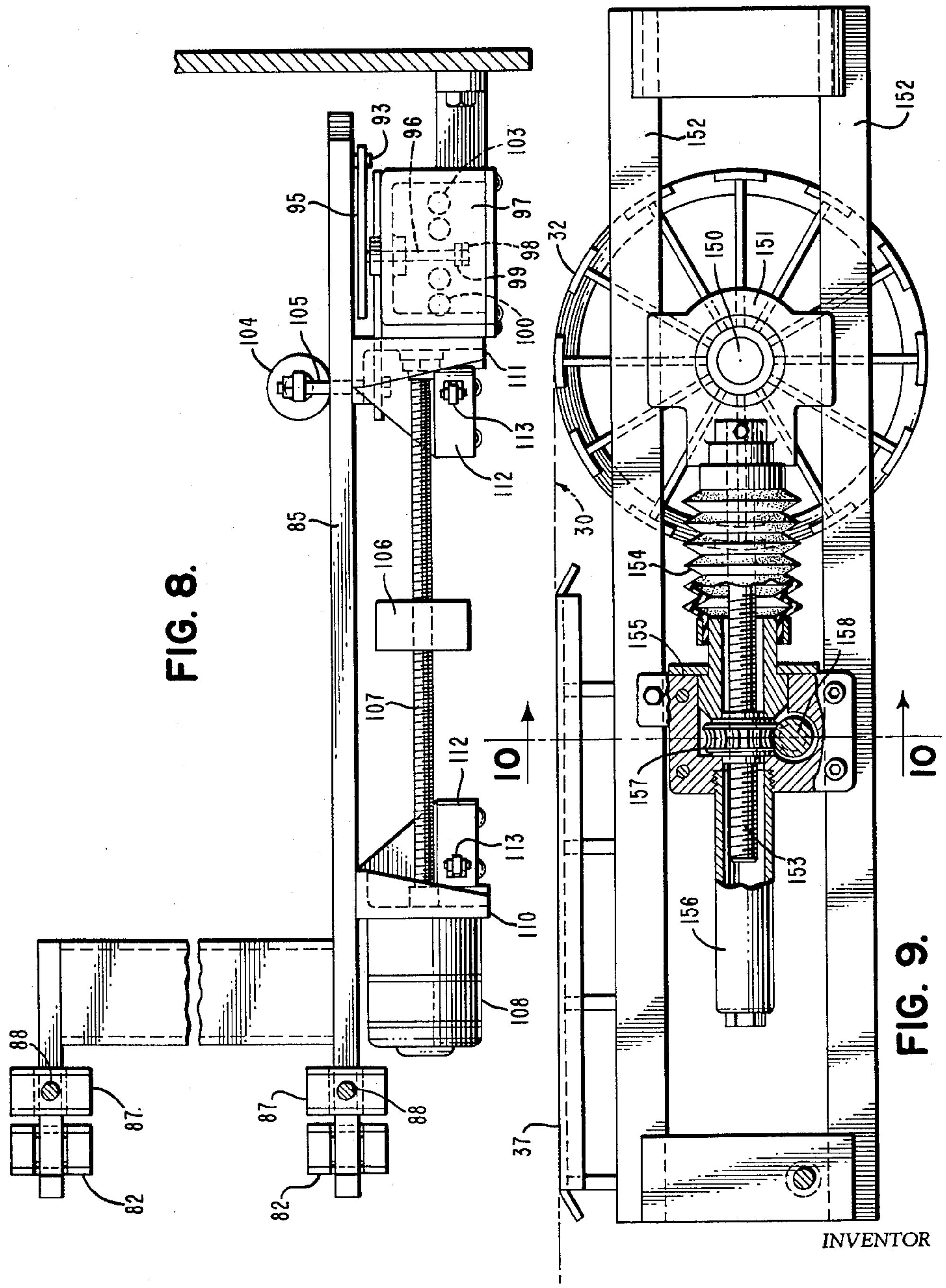
FIGURE 8 is a top view of the weigh lever and its related components, and viewed along line 8—8 of FIGURE 7, the cross member of the weigh lever being broken.
FIGURE 9 is a side elevation, partly in section, of the tail pulley take-up mechanism as seen from opposite side as in FIGURE 3 and on a larger scale.

Violent swings of the weigh lever 85 are prevented by means of dashpot 104, which is fixed at its lower end to mounting plate 97 and at its upper end to the weigh lever 85 by means of pin 105 (see FIGURE 8). To adjust the weight and the balance of weigh lever 85, a movable poise 106 is provided. The weighing system is so designed that this poise is normally in the middle of its possible motion. The poise 106 is moved back and forth by means of threaded screw 107 which is, in turn, rotated by the geared head motor, known as the "calibration motor" 108. This motor is mounted upon bracket 110 fixed to weigh lever 85. A similar bracket 111 carries the other end of the threaded screw 107. Also mounted upon these two brackets are limit switches 112, which are provided with actuators 113. These switches are closed when poise 106 moves sufficiently far in each direction, and they serve the purpose of preventing overtravel of the poise.

Although the weight upon the weighing roller 39 is supported by support rods 81, blocks 80 are also provided with drag links 114 to prevent the blocks 80 from undesired horizontal motion. The other end of each drag link 114 is pivotally affixed to the housing of the feeder at point 115. It should be noted from FIGURE 3 that the pivot point 115 is preferably in exact line with the top surface of the weigh span rollers and the weighing roller, when the weighing roller is in its normal position.

Block 80 is provided with a hook 116 at its bottom end for the purposes of calibration with a suitable weight 117, which is used only at the time of calibration.

The leveling bar actuating mechanism is shown in FIGURE 11. The leveling bar 62 is carried upon two arms 120 which are carried by shaft 121 pivotally mounted in the weighing mechanism compartment. Affixed to the same shaft is a pointer 122 which permits the height of leveling bar 62 above belt 30 to be read from scale 123. The pointer and the scale are visible through one of the bull's eyes in the weighing mechanism compartment. It will be noted that the leveling bar is in the interior of the feeder, that is, in with the coal, whereas the remainder of this mechanism is in the weighing compartment. The seal between the two is provided by shaft bearings on shaft 121. The leveling bar 62 and its support arms 120 are outside of the weighing mechanism compartment; the shaft passes through this seal, and the remainder of the mechanism operated by the shaft 121 is within the weighing compartment.

For the actuation of leveling bar 62, arm 124 is affixed to shaft 121. Screw 125 is connected to the arm 124 at pivot shaft 126 in such a manner (see FIGURE 12) that the screw cannot rotate about its own axis. Surrounding the greater portion of screw 125 and in threaded contact with the small threaded portion of screw 125 is cylinder 127 which, in turn, is suitably journaled inside housing 128 so that it can rotate about an axis concentric with screw 125 but such that all axial thrust is taken by housing 128. Housing 128 has an extension 129 which is pivotally connected to the weighing compartment at 130. Mounted upon extension 129 is the weight correction motor 131, which is a small, geared head motor. The output shaft of this motor drives the cylinder 127 through coupling 132. Rotation of cylinder 127 causes horizontal movement of screw 125, which results in raising or lowering the leveling bar 62.

Rod 133 is pivotally attached to arm 124 at point 134 on the pivot shaft 126 and is further guided by a guide 135 mounted on housing 128. Two cam surfaces mounted on rod 133, namely, 136 and 137, serve to actuate limit switches 138 and 139 (see FIGURE 11), which are electrically interconnected with the weight correction motor 131 so that overtravel is not possible.

Rod 140 is also pivotally connected to arm 124 at point 141. Rod 140 is surrounded by compression spring 142, one end of which bears against an extension 143 of housing 128 and the other end of which bears against a washer and nut 144 at the end of rod 140. Washer 144 is guided within a bushing 145 mounted in another extension 146 of housing 128. The action of this compression spring is to draw leveling bar 62 as high as possible as allowed by the position of screw 125. In this manner all clearances are taken up, such as the clearance at pivot 126, the clearance between screw 125 and cylinder 127, and in the bearings supporting cylinder 127 and housing 128. Thus the position of leveling bar 62 is very accurately determined, the spring 142 serving, therefore, as a backlash eliminator.

FIGURE 9 shows the take-up mechanism as it applies to the tail pulley 32. A similar mechanism is also used for the clean-out conveyor tail sprocket. The tail pulley 32 is mounted on a shaft 150 which is suitably journaled in a sliding, bearing block 151. This bearing block is guided by guides 152 which are fixed to the feeder housing. Bearing block 151 is positioned by screw 153. This screw is essentially rigidly attached to the bearing block 151 and operates entirely within a dust tight enclosure. This enclosure protects it from the coal dust and moisture which otherwise is prevalent in the interior of the feeder. The enclosure consists of a flexible bellows 154, the interior of a block 155, which is fixed to guides 152, and an extending cover 156. Surrounding screw 153 is a worm gear 157, whose internal bore is a nut on the screw and whose circumference forms a worm gear meshing with worm 158. Rotation of worm 158 is accomplished by means of a manually operated shaft 159 extending to the outside of the feeder housing (see FIGURE 10). There is no permanent crank or hand wheel attached to this shaft outside of the feeder housing, but rather it is operated by means of a suitable key whenever necessary, said key being engageable with the outer end of the shaft 159. The shaft 159 extends across the width of the feeder and operates the worm gears for the take-ups at each side of the tail pulley simultaneously. In this way, the tail pulley can be moved so as to adjust the tension of the feeder belt, but, at the same time the tail pulley always remains parallel to the head pulley and to its own original position. The thrust on worm gear 157 is taken up by its two end faces which bear against corresponding internal faces of block 155.

As will be discussed later, it is the principle of this gravimetric feeder to deliver precisely a predetermined weight of coal for each turn of the head pulley. In order for this to be the case, and in order to determine that the weight is directly determined by the calibration of the scale and is not subject to an additional calibration factor, it is necessary that the length of the weigh span between the weigh span rollers 38 be exactly equal to the length of travel of belt 30 during one revolution of the head pulley. This means that the length of the weigh span must be adjusted to correspond to slight deviations in the exact location of the pitch line of the belt as it travels around the head pulley. This is accomplished by means of an eccentric bearing mounting for the weigh span rollers. Both weigh span rollers are adjusted equally in opposite directions so that the weighing roller remains precisely in the middle. The eccentric mount for each roller 38 is shown in FIGURE 13. The housing 1 has a hole 160 accurately bored into it for the bearing mount. The location of this hole is accurate with respect to that of the other weigh span roller, and the pivots which hold the drag links for the weighing roller. The centerline of this bored hole is shown at 161. The bearing housing 162 which fits into hole 160 has an eccentrically located hole 166 with centerline 163 for the bearing and grease seal which carry the weigh span roller. The bearing is covered by a bearing cap 164 and the entire assembly held to the feeder housing by screws 165. By rotating the bearing housing by 180° during assembly, it is possible to have the eccentricity act in such a way as to either lengthen or shorten the length of the weigh span. By having a selection of bearing housings of varying eccentricity, it is possible to select a combination which will give an exact length of the weigh span as desired. The fact that the eccentricity can be made either to add to or subtract from the length of the weigh span means that only one half the number of bearing housings are required as would otherwise be necessary.

Figure 10:
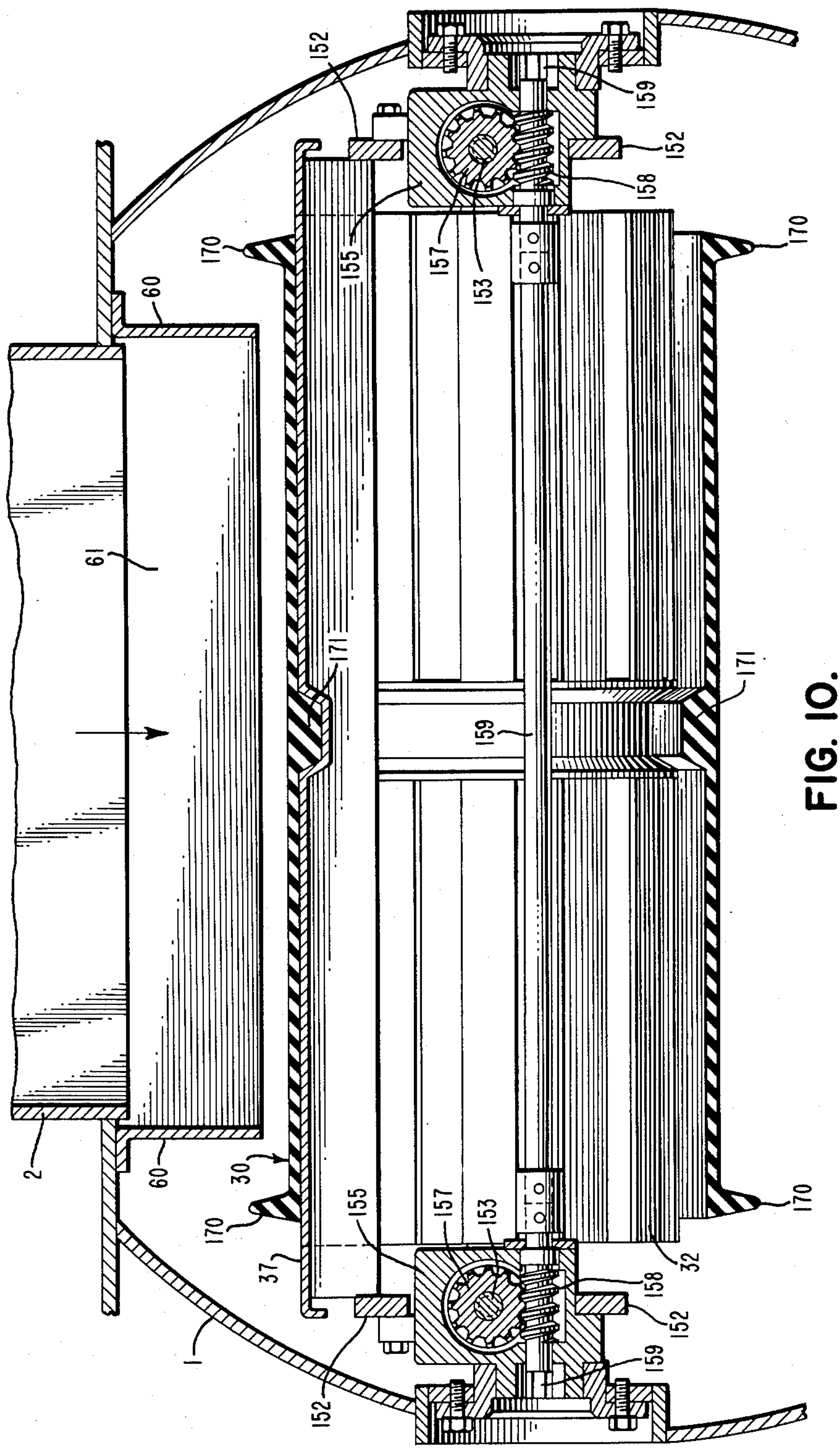
FIGURE 10 is a transverse cross section taken along section line 10—10 of FIGURE 9.

As best shown in FIGURE 10, the belt 30 is essentially flat in its central portion, but having vertically projecting curbs 170 at each side and a V guide 171 in the inside center. The curbs, or Vanner edges, are manufactured of soft rubber and attached to the outside edges of the belt. The overall width of the belt is somewhat greater than the width of the inlet, but, nevertheless, it would be possible, as coal passes out from between the side plates 60, for the coal to spread over the edges. For this reason, the curbs are included. The angle of repose of the coal, which normally is in the order of 27° to 40° is such that the majority of coal particles never come near the edge. However, the curbs prevent even small quantities of particles from being lost over the edges. They also prevent free surface moisture from dripping over the edges, which might possibly cause corrosion of the interior components of the feeder.

The outside edges of the curbs are shown in the drawing as nominally perpendicular to the surface of the belt. However, the process of manufacture is such that these curbs tend to have an inclined surface both on the side toward the center of the belt and on the sides toward the outside of the belt. Thus the profile of the curb is actually more of an inverted V. This is favorable, since it means that the curb compresses and becomes more squat when going around the head and tail pulleys, instead of collapsing and tending to fall towards the outside of the belt with the extremity of the curb more or less becoming parallel to the surface of the belt. The fact that the curb compresses when going over the head or tail pulley apparently results in lower peak internal stresses and correspondingly in fewer tears of the curb.

Centrally located along the inside surface of the belt is a V guide 171. It is expedient to have this guide slightly wider than the standard width for a V belt. This V guide on the belt runs in grooves in the head pulley, tail pulley, tension roller, weigh span rollers, and weighing rollers. It serves to track the entire belt. The use of the V guide means that it is not necessary for the head and tail pulleys to have a crown; it is also unnecessary to have guiding rollers for the belt along each edge. Thus the belt can lie flat, which contributes materially to its flexibility and correspondingly to the sensitivity of the weighing mechanism.

Also the curbs 170 contribute to the flexibility of the belt such that a troughed belt is not necessary in order to have the same coal carrying capacity. A troughed belt definitely has more stiffness and less flexibility about its cross section than the flat belt with curbs.

In accordance with the sketch shown in FIGURE 14, three phase electrical power is supplied to the feeder through a disconnect switch 200 with suitable overload protecting device. This power is supplied to the feeder drive motor 19 through contacts 206A, 206B, 206C, on the feeder motor starter 206, and through the overload coils 201 and 202.

Single phase power for the control circuits is obtained at the proper voltage through transformer 204, which is protected by fuse 205. A start-stop switch 207 actuates the feeder motor starter 206. In series with this motor starter are also normally closed contacts 201A and 202A on the two feeder motor overloads. All the remainder of the circuitry is supplied with power through contacts 206D on the motor starter so that the circuits are energized only when the feeder is running.

As has already been mentioned briefly, it is one of the features of this feeder to provide exactly 100 pounds of coal per revolution of the head shaft. For that reason a counter 208 provides indication of the total weight of coal which has been fed merely by counting the number of times that the contact 75A of the pulsor switch has been closed.

The major function of the control circuitry is to control the operation of the weight correction motor 131. The control of this motor involves two control relays 210 and 211 and a time delay relay 212. As the contact 212A on the time delay relay is normally closed, control relay 210 is energized whenever a pulse is received through the pulsor switch contact 75B and when the overweight limit switch contact 102A is closed. This relay 210 remains energized through holding contact 210A even after the end of the brief closure of the pulsor switch contact 75B. The relay is not deenergized until the timing period is up and contact 212A is opened. Control relay 211 operates in a similar manner if an underweight condition is present as indicated by underweight limit switch 101A being closed, and this relay remains energized for the remainder of the timing period by virtue of contact 211A. Whenever the control relay 210 or control relay 211 is energized, the time delay relay 212 is also energized through contact 210B or 211B. However, its normally closed contact 212A does not open until a definite period of time after it is first energized. However, after the contact 212A is opened and control relays 210 or 211 are deenergized, the timing relay 212 is deenergized and its contact 212A closes again immediately. In this fashion whenever there is a pulse from the pulsing switch and simultaneously either an overweight or underweight condition exists on the weighing roller, then control relay 210 or control relay 211 will be energized for a definite period of time.

Electrically the weight correction motor 131 consists of a two winding, three wire, alternating current motor. This type of motor is self-starting and runs in either direction, depending upon how it is energized. If an overweight condition is present so that control relay 210 is energized, and if the position selector switch 213 (not shown) is in its "run" position so that contacts 213A and 213B are closed, then current is supplied to one winding of the weight correction motor directly and through the capacitor 214 to the other winding so that the motor runs in such a direction as to lower the leveling bar 62. Conversely, if the underweight control relay 211 is energized, then the weight correction motor 131 runs in the opposite direction for a definite period of time in such a direction as to raise the leveling bar 62 and to increase the weight of coal upon the weigh span. Because the time during which the weight correction operates is controlled by the timing relay 212, the amount of change made in the height of the leveling bar for each correction is unvarying. It should also be noted that a correction can be made only once for each revolution of the head pulley, as only at that time is the contact on the pulsor switch closed. Included in the circuit for the weight correction motor are contacts 138A and 139A, on the limit switches 138 and 139, respectively, which prevent possible overtravel of the leveling bar.

The normal position of selector switch 213 is such that the feeder is ready to "run." In its "calibrate" position with contacts 213C and 213D closed, the calibration motor is connected in its place. In other words, an overweight condition or an underweight condition causes the calibration motor to move the poise on the weigh level in the one direction or the other. Again there are limit switch contacts in the circuits to prevent overtravel. The principle of calibration is discussed further below.

The magnetically operated mercury switches 100 and 103 serve to provide indication to the operator that the load on the weighing roller is excessively high or excessively low. Such conditions should not occur under normal conditions and correspondingly should be brought to the operator's attention. This can be done, for example, by suitable alarm lights 216 and 217 each connected in series with the corresponding extreme overweight or extreme underweight limit switch.

The lights 16, which are provided for interior illumination of the feeder, are intended to be supplied with power from a separate circuit since it may be desired to have these lights in operation when the feeder disconnect switch 200 is open. Thus, the electrical circuit for the lights 16 is not shown.

FIGURE 15 shows an air lock 220 with a bell type valve 221 at the top and a bell type valve 222 at the bottom outlet 223, the latter feeding into a suitable pressurized process vessel 224. Bulk material 225 at essentially atmospheric pressure is fed into the air lock through the top opening 226. This particular illustration is typical of possible uses of the method of filling voids in pressure vessels and should not be considered as limiting of the invention. The principal interest in using this technique, however, is in conjunction with the gravimetric feeder itself.

There are basically three reasons for wanting to fill up the voids inside a pressure vessel. One of these is to avoid tramp material. Dust or small particles may lie or accumulate in an unused portion of the vessel and eventually be knocked free, causing contamination of the product by large chunks. The accumulations may also spoil and contaminate the product in that fashion. If the material is inflammable, the accumulations may also represent a fire hazard. A further possibility is that they may act corrosively on the body of the pressure vessel or on components within it.

A second reason for filling voids in a pressure vessel is to reduce the internal volume to an absolute minimum. In an air lock such as illustrated in FIGURE 15, compressed air will have to be used to pressurize the vessel up to the pressure of the vessel 224 located at the exit. The smaller the internal volume of the air lock vessel is, the smaller the required amount of compressed air will be. Therefore, it is desirable to fill the voids as indicated at the top of the vessel so that the bulk material in the vessel occupies substantially the entire usable area.

A third reason for filling the voids is to guide the flow of material within the pressure vessel. For example in the illustration of FIGURE 15, the bottom section is filled into a conical shape so that the bulk material can flow out readily into the exit opening 223.

The reason why the pressure vessel is not constructed, in the first instance, with the desired contour and without voids is based upon the strength requirements of the vessel. Such vessels are most often cylindrical with dished heads. It is the purpose of this invention to provide a method of filling the voids which can be accomplished economically and which will permit all stresses to be carried by the pressure vessel itself.

To provide an internal contour of desired shape for the pressure vessel 220 two conical members 227 and 228 of substantially lighter material (lower strength) than the outer cylindrical body of the vessel are secured internally to the top and bottom, respectively, of the vessel as shown in FIGURE 15, thereby forming spaces 229 and 230, respectively, between the conical members and the wall of the vessel 220. These spaces will have no openings except those provided for the filling of the voids during the construction of the vessel. The spaces are then filled with a suitable solid or substantially non-compressible fluid 231. Examples of suitable materials are concrete, sand, water and oil.

When the spaces 229 and 230 have been filled, the lining pieces 227 and 228 will act as diaphragms to transfer whatever internal pressure may be present through the material 231 to the pressure vessel 220.

Returning to FIGURES 3 and 5, the space 55 between the trough 54 and the cylindrical shell is filled with material 57, preferably concrete. The thickness and/or strength of the trough 54 can be considerably less than that of the cylindrical housing, since the force of any explosion would be transferred from the trough 54, through the concrete 57 and to the cylindrical housing of the feeder.

It is the principle of this gravimetric feeder to establish a constant weight of coal discharge per turn of the head pulley. This means first of all that the feed rate by weight is proportional to the motor speed. Secondly, it means that the total weight of coal fed through the machine is determined by the number of counts given by the pulsor switch.

It is the function of the mechanism of the gravimetric feeder to establish a constant weight of coal per turn of the head pulley. To accomplish this end, the first thing that is done is to set the length of the weigh span exactly equal to the travel of the belt for one revolution of the head pulley. This is done by means of the eccentric mounts discussed above. This adjustment is also made so that the weighing roller remains extcaly in the middle of the two weigh span rollers. For that reason exactly one half of the weight of the coal over the weigh span plus the weight of the belt between the weigh span rollers is supported on the weighing roller. It is preferred to have the weight of coal discharged per turn of the head pulley to be 100 pounds, and, correspondingly, the weight of coal on the belt between the weigh span rollers is 100 pounds.

As the coal becomes denser or lighter, it is necessary to adjust the leveling bar so that the ribbon of coal on the belt becomes thicker or thinner. By so doing the weight of coal on the weigh span can be kept constant.

In addition to setting the horizontal length between the weight span rollers are also located vertically within a close tolerance. In particular, the two weigh span rollers and the weighing roller are set so that the top surfaces of these rollers are exactly in line under normal conditions, with no coal on the belt. The height of the weighing roller and its tilt from one side to the other are adjusted by means of the two screws which support the weigh lever. If the three rollers are exactly in line, then the effect of belt tension cancels out. Otherwise, for example, if the weighing roller were higher than the two weigh span rollers, then the tension of the belt would have a tendency to draw the weighing roller down, and the amount of this force would be directly proportional to the belt tension.

The adjustment of the weigh lever supports up or down is done with the belt in place because it is necessary to disassemble the weighing mechanism in order to remove the belt as will be shown below. A straight edge can be laid between the weight span rollers and over the weighing roller outside of the belt; in fact it may be leaned up against the curb of the belt if found desirable to do so. At the same time the weighing roller is being brought into line with the two weigh span rollers, it is necessary to maintain the weigh lever level to within a fair tolerance. This is the normal operating point of the machine, and a level weigh lever is required by the design calculations of its sensitivity to weight changes. When the weighing roller is in line with the weigh span rollers and the weigh lever is level, then the entire magnetic switch assembly can be moved up or down so that the magnet actuating the switches is in its central position.

It is a basic principle of this gravimetric feeder that the weighing roller is always exactly in line with the weigh span rollers providing the weight of coal on the belt is correct. Any deviation in the weight of coal will cause the leveling bar to be actuated so as to bring the weighing roller exactly back to its normal position. Specifically, when the weighing roller is supporting a load which is slightly too heavy, the weigh beam is deflected slightly from its normal position so as to actuate the overweight limit switch 102. This does not instigate an immediae correction to the leveling bar but rather when the pulsor switch is closed. Since the coal over the weigh span is exactly equal to that discharged over the head pulley during one revolution and since the pulsor switch is closed once each revolution, the coal on the weigh span has an opportunity to affect the leveling bar only once. At the same time the amount of correction made in the height of the leveling bar is a discreet amount in that the timer in the electrical circuit allows the electrical motor only to operate for a definite time. The amount of motion of the leveling bar each time it is actuated should be less than one half the guaranteed range of accuracy of the machine so that a single correction for being slightly underweight cannot cause the weight of coal on the belt to become more than the guaranteed overweight tolerance.

As stated above, it is one of the principles of this gravimetric feeder that the weighing roller should be exactly in line with the weigh span rollers whenever the weight of coal over the weigh span is exactly 100 pounds. Also the centerline of the pivot which holds the drag link that prevents horizontal motion of the weighing roller is in the same plane as the top surface of the weighing roller and the weigh span rollers. Thus, any horizontal force transferred from the belt to the weighing roller in order to make the weighing roller revolve, does not result in a moment of force about the drag link support point, which would have to be compensated by a vertical force on the weighing roller so as to affect the accuracy. The reason for having both of these features is that they eliminate any direct influence of the belt tension upon the accuracy of weighing. However, the belt tension does affect the sensitivity of the weighing mechanism in that it controls the amount of deflection of the weighing roller for a given deviation from the standard weight of 100 pounds per revolution of the head pulley. For this reason, the belt tension is maintained constant by means of the tension roller. A belt typically tends to become longer during use, which is indicated by a lower position of the tension roller. This does not result in a large change in the belt tension, but it is possible to bring a belt tension back to its exact value by taking up on the tail pulley until the tension roller is in the normal position.

It is necessary to calibrate any gravimetric feeder. This is accomplished by moving the poise on the weigh lever to such a position that it exactly counterbalances the normal load of 100 pounds of coal over the weigh span when the weighing roller is in its central position in line with the weigh span rollers. The standard method of calibration, which is not used in the present machine, consists of dragging a calibrated chain, with a known weight per unit of length, on the belt instead of the coal.

One end of the chain is fixed, so that the chain is actually not fed through the machine. Because there is slipping between the chain and the belt, it is frequently necessary to provide lubrication to reduce the magnitude of the friction force. Nevertheless, this friction force may readily result in a component which affects the accuracy of weighing. Practical experience with this method of calibration usually has indicated that it is necessary to calibrate both with the chains in the center of the belt and with the chain a each side, and take some intermediate value as the correct position of the poise.

Because it is known that the length of the weigh span is exactly the forward travel of the belt during one revolution of the head pulley and also because the weighing roller is exactly half way between the two weigh span rollers, it is certain that the weighing roller supports a load of exactly 50 pounds under the normal operating conditions. The machine can thus be calibrated by hanging test weights 117 from the hooks 116 on the bearing mountings 80 of the weighing rollers. The usual practice is to use two 25 pound weights, one on each side. Calibration is then accomplished by moving the poise so that the test weights are counterbalanced and the weigh beam is in its central position. This is done automatically by placing the selector switch on "calibrate." This is done with the coal supply to the feeder shut off. The feeder runs normally, except that the overweight and underweight contacts act through the pulsing mechanism not to change the height of the leveling bar, but rather to run the calibration motor. This moves the poise 106 in or out along the weigh beam until the poise reaches such a position that the weigh beam is in balance. The unit is then calibrated. The test weights may be removed, the coal supply to the feeder opened, and the equipment placed into service.

One factor which influences the accuracy of continuous weighing devices similar to the present is the uniformity of the weight of the belt. Half of the weight of the belt over the weigh span is carried by the weighing roller and correspondingly also by the weigh beam. It must be counterbalanced by the poise. If the weight of the belt per unit length is not uniform, this will cause some fluctuation in the weight of coal fed by the machine as it is actually the total of the two which must be constant. One of the reasons that a gravimetric feeder such as the present can weigh more accurately than a continuous device on a conveyor belt is that the belt for the present feeder is fairly short and can be made with uniform weight per unit length. This is much more difficult on a conveyor belt, which may be extremely long and spliced at several positions.

Occasionally a belt is damaged and must be replaced. This is accomplished in the present design by removing the weigh span rollers through the bearing caps which support them in the side of the machine; removing the head pulley through the large bearing cap on the side of the machine opposite the gear box, the drive shaft coming apart at the coupling just inside the housing from the gear box; and the belt is removed together with the take-up assembly and the belt support plate through the front door of the machine. Reassembly is done in the reverse order.

The apparatus and the method for cleaning the bull's eyes 17 are illustrated in FIGURES 16 to 19 inclusive. As shown in FIGURE 16, a typical bull's eye 17 is shown comprised of a circular pane of glass 400 set into a bull's eye frame 402 by means of a retainer 404. The bull's eye frame 402 is welded into a port defined in the feeder frame designated by the reference numeral 406. It will be appreciated that the feeder frame may constitute any portion of the feeder housing including such parts as doors.

The object of the cleaning apparatus is to maintain the inside surface of the glass 400 free from dust, grime and other matter which would tend to obscure observation through the glass. This is accomplished by means of a washing and drying apparatus comprising a tank 410 containing a cleaning fluid such as water or the like which has fitted into it a pump housing 412 which includes a tube 414 which projects substantially to the bottom of the tank 410. The pump housing is interconnected with a source of compressed air as indicated by arrow 416 and exhaust line as indicated by arrow 418. Two lines lead away from the pump housing to a control block 420. One of these lines 422 communicates with a control passage 424 defined within the block 420 into which passage has been inserted a reciprocally mounted control button 426. When the button 426 is depressed the passage 424 is placed in communication with the atmosphere. When the button 426 is in its upper position, which it normally occupies in repose due to a spring bias, it will block the passage 424 and seal same from the atmosphere. The second line leading from the pump housing is designated by the reference numeral 428 and it interconnects with one end of a passage 430 also defined in the block 420. The other end of the passage 430 communicates with a line 432 in the form of a flexible hose which is coupled at its upper end by means of connection 434 to a nipple fitting 436. The bull's eye frame 402 defines a through-bore 438 extending from the outside and terminating at a location on the inside adjacent the lower end of the glass 400. Both ends of this bore 438 are threaded and nipple 436 is screwed into the lower threaded portion and an orifice nipple 440. Attached to the orifice nipple 440 is a deflecting blade 442 of suitable design and location to direct spray issuing from the orifice 444 of the nipple 440 onto the inner surface of the glass 400 in any preselected pattern of spray. A ball check 446 is located within the bore 438 and normally fits against a seat defined by the end of the nipple 436. A pin 448 extends substantially transversely through the center of the bore 438 and is held in position by the bull's eye frame 402. The purpose of pin 448 is to prevent the ball check 446 from rising up and seating against the inner opening of the nipple 440. The purpose of the ball check is to prevent any pressure in the interior of the feeder from being transmitted back through the line 432. In the event the feeder is functioning under vacuum conditions, the ball check 446 will have to be spring loaded.

The details of the pump housing are shown in FIGURES 17, 18 and 19. Essentially, the pump housing comprises an outer cylinder 450 in which is located a piston 452. A reduced cylindrical section 454 is bolted to the bottom of cylinder 450 by means of bolts 456 and to the lower end of the section 454 is attached the tube 414 which projects to the bottom of the tank 410. The lower end of the tube 414 is provided with a check valve comprised of a short tube 458 which defines a restricted opening 460 at its lower end. A ball check 462 is arranged to seat against the rim defining the opening 460 and a pin 464 extends transversely through the middle of the tube 458 to restrict the ball check 464 from rising too high in the tube. The tube 458 is attached to the tube 414 in the manner illustrated by any suitable means.

The section 454 defines a shoulder 464 against which one end of a spring 466 can function. The other end of the spring bears against the lower end face of the piston 452 and normally urges the piston to the upper end of the cylinder 450. The cylinder 450 includes a radially projecting section which defines a passage 470. This passage 470 is in communication with the main section of the cylinder 450 via a port 472 defined in the wall separating the passage 470 and the main compartment of the cylinder. The port 472 is located approximately midway of the cylinder and in a location such that when the piston 452 is pressed against the top end of the cylinder 450 it will cover the port 472, but when it is at its lower position bearing against shoulder 474 it will uncover the port 472 permitting communication between the main cylinder compartment and the passage 470.

The lower end of the passage 470 communicates via a check valve with the reduced section 454 and the tube 414. This check valve is comprised of a valve seat member 476, a ball check 478 and a pin 480 which extends transversely through the middle of the passage 470 to prevent the ball check 478 from rising too high in the passage.

The upper end of the cylinder 450 is closed by means of a block 484 which is flanged to match flanges on the cylinder 450. Threaded bolts 486 effect the connection. The block 484 defines a passage 488 which aligns wits passage 470. Passage 488 defines a right angle turn and terminates in a threaded section 490 to facilitate attachment of the line 428. The block 484 also defines a passage 492 of reduced section which communicates the main chamber of the cylinder 450 with a spool valve assembly contained in a block 494. The block 494 is attached to the top of block 484 in any convenient fashion. Two threaded openings 496 and 498 are defined in the top of the block 494 to facilitate attachment of a compressed air hose 500 and an exhaust hose 502. The block 494 defines a transverse passage 504 into which seats in reciprocating fashion a spool valve 506. The passage 504 and the valve element 506 are both circular in cross section. Both ends of the valve element 506 are provided with recessed bores 508 and 510. A spring 512 is fitted into the bore 510 and functions between the valve element 506 and the end wall 514 which constitutes a part of the block 494. A port 516 is defined in the end wall 514. The spring 512 normally urges the valve element 506 away from the end wall 514.

The other bore 508 defined in the opposite end of the valve element 506 communicates at its inner end via a passage 518 with an annular passage 520 defined by a reduced section of the valve element 506. The second annular passage 522 is defined by a further reduced section of the valve element 506. When the valve element 506 is forced against the wall 514 overcoming the force of spring 512 the passage 492 in block 484 is in communication with the exhaust line 502 via the passage 522. When the valve element 506 is forced away from the wall 514 by the action of spring 512, the passage 492 in block 484 is in communication with the compressed air line 500 via the annular passage 520. The normal condition is brought about by virtue of the compressed air line always being in communication with the bore 508 via the annular passage 520 and the restricted passage 518. Bore 508 is in communication with the line 422 at all times and, as previously described, line 422 connects with passage 424 in the block 420. If the control button 426 is in its up position it cuts off the passage 424 from the atmosphere and consequently a steady-state pressure condition will exist and the compressed air will force the valve element 506 to the right as viewed in FIGURES 17 and 18 and press same against the end wall 514. In this condition, the interior of the cylinder 450 will be in direct communication with the exhaust line 502.

When it is desired to spray the apparatus and to clean the glass 400, the control button 426 is depressed placing the passage 424 in communication with the atmosphere and thereby relieving pressure in line 422 and in the bore 508. Once the pressure is diminished, the spring 512 then has a force sufficient to move the valve element 506 to the left cutting off the exhaust line 502 and placing the compressed air line 500 into communication with the interior of the cylinder 450. As compressed air is fed into the cylinder the piston 452 is pushed down until it finally reaches the position illustrated in FIGURE 18. As the piston 452 is pushed down, it must be borne in mind that the lower section of the cylinder 450 is filled with water and this water is forced out through the passage 470 since the tube 414 is closed by the check valve at the lower end thereof. This water will travel through line 428, passage 430, block 420, line 432, nipple 436, bore 438, and be discharged through orifice 444 in nipple 440 against deflecting blade 422 and deflect against the inside surface of the glass 400 to clean same. Immediately following the discharge of the water, the piston at this time being in the position illustrated in FIGURE 18, there will follow a blast of air since the compressed air line will now be in communication with the passage 470 via the port 472. The compressed air will also be discharged against the glass 400 and will continue to be discharged until the control button is released and returned to its up position. Once this event occurs, the pressure in the line 422 will build up to that of the compressed air source and the valve element 506 will then be forced against the action of spring 512 against the wall 514.

As evident from the foregoing, a method is described whereby the windows are first washed or wetted with a liquid and then dried with a gas. In the particular form shown, a spray nozzle is mounted adjacent to the glass of the bull's eye in the interior thereof. A further feature of the foregoing is the provision of a check valve adjacent to the spray means in the event there is pressure or vacuum inside of the vessel. A further significant aspect of the foregoing is that the various steps are performed in proper sequence upon the actuation of a single control button.

Many of the specific relationships mentioned in this application can be varied as conditions may indicate without changing the essence of the invention. In particular, the length of the weigh span need not be exactly that corresponding to the forward motion of the belt during one turn of the head pulley, but could be any suitable fraction or multiple. The essential feature is that the length of the weigh span is constructed so as to bear a known relationship to the motion of the belt during one revolution of the head pulley. It is also not necessary that the pulse which controls the operation of the leveling bar or motion of the poise be given exactly once per revolution of the head pulley. This could be twice or even a greater number of times. It could also be given less than once per revolution of the head pulley. If this latter is done in conjunction with a weigh span whose length is equivalent to the motion of the belt during one revolution, then it will not be true that every particle of coal has at least one opportunity to affect the weighing system. In applications where it is known in advance that the density of the coal varies slowly, this may not be disadvantageous.

What I claim is:

1. A gravimetric feeder comprising a housing having an inlet in the top at one end and an outlet in the bottom at the other end, a head pulley located adjacent and above the outlet, a tail pulley located adjacent and below the inlet, an endless belt extending around said pulleys, means defining a weigh span along the upper course of said belt, a weighing roller engaging the upper course of said belt within the limits of said weigh span, a leveling device for determining the height of material on said belt, a weighing mechanism coupled to said weighing roller, means to control the position of the leveling device responsive to the balance condition of said weighing mechanism, drive means, coupling means for operatively connecting said drive means with one end of said head pulley, said coupling means being detachable by relative axial movement, bearing means including a bearing cap mounted in an aperture defined in said housing, said aperture being of a larger diameter than that of said head pulley, and said bearing means supporting the other end of said head pulley, tail pulley take-up means for moving said tail pulley toward and away from said head pulley, driving means for actuating said take-up means, said driving means adapted to be driven by forces applied to it from outside said housing.

2. A gravimetric feeder comprising a belt, means defining a weigh span including a pair of spaced supports contacting said belt, means to advance said belt over said supports with a portion of said belt spanning said supports, weighing means positioned to contact the underside of said belt between said supports and to sense the weight of said belt and material thereon, means actuated responsive to said weighing mechanism to provide an indication of the weight sensed by said weighing mechanism, said belt being characterized by curbs which extend longitudinally along each edge, whereby the ratio of material loading per unit length of belt to the longitudinal rigidity of the belt can be increased without the possibility of spillage over the sides of the belt, the undersurface of said belt defining a longitudinally extending projection and said supports and said weighing means defining mating slots in which said projection rides to aid in tracking said belt, material inlet means positioned over one end of said belt and having a downward facing mouth, material guide skirts positioned above said belt and parallel to the direction of movement of said belt, said skirts being positioned between said curbs and said inlet means and said skirts having bottoms located below the tops of said curbs and having tops located above the plane of said mouth, said skirts having a length which is substantially equal to the longitudinal dimension of said mouth, whereby said curbs allow for a relatively narrow belt and substantially short skirts while preventing spill-over of fed material.

3. A gravimetric feeder comprising a belt, supply means having a controllable discharge member to introduce material onto said belt, means defining a weigh span, means to advance said belt past said supply means and then over said weigh span with a portion of said belt spanning said weigh span, a weighing mechanism preset to balance at a given loading including weight sensing means contacting the underside of said belt within the limits of said weigh span to sense the weight of said belt and material thereon and to load said weighing mechanism, said weight sensing means being positioned in the plane of said weigh span at said given loading, drive means actuated responsive to said weighing mechanism sensing deviations from said given loading to drive said controllable discharge member in a direction to restore said given loading whereby a certain amount of lost motion may be unavoidably present, and means resiliently biasing said controllable discharge member in one direction to take up all lost motion in said one direction whereby extremely precise and fine movements of said controllable discharge member can be effected by said drive means and said controllable discharge member cannot shift position when not driven.

4. A gravimetric feeder as defined in claim 3 wherein said means resiliently biasing is comprised of a spring attached at one end to said controllable discharge member and at its other end to a stationary support.

5. A gravimetric feeder as defined in claim 3 wherein said controllable discharge member is comprised of a leveling bar mounted at one end of a bell crank mechanism, with the other end of said mechanism being resiliently biased by a spring.

6. A gravimetric feeder comprising a belt, controllable supply means to introduce material onto said belt, means defining a weigh span, means to advance said belt past said supply means and then over said weigh span, a weighing mechanism having a balance point including weight sensing means contacting the underside of said belt within the limits of said weigh span to sense the weight of said belt and material thereon and to load said weighing mechanism, said weight sensing means being positioned in the plane of said weigh span at said balance point, means actuated responsive to deviations from said balance point to control said supply means in a sense to restore said balance point, and means for calibration comprising bias means for biasing the weighing mechanism to preset the weight of material required on the portion of the belt over the weigh span to position the weighing mechanism at its balance point, means for imposing a standard weight on said weighing mechanism and means for adjusting said bias means so that said weighing mechanism is at its balance point with a standard weight imposed and no material on said belt.

7. A gravimetric feeder as defined in claim 6 further including means to adjust the length of said weigh span.

8. A gravimetric feeder as defined in claim 6 further including means to adjust the vertical position of said weight sensing means.

9. A gravimetric feeder comprising a belt, controllable supply means to introduce material onto said belt, means defining a weigh span, means to advance said belt past said supply means and then over said weigh span with a portion of said belt spanning said weigh span, a weighing mechanism preset to balance at a given loading including weight sensing means contacting the underside of said belt within the limits of said weigh span to sense the weight of said belt and material thereon and to load said weighing mechanism, said weight sensing means being positioned in the plane of said weigh span at said given loading, control means actuated responsive to unbalance of said weighing mechanism adapted to control either said supply means or the balance setting of said weighing mechanism, means adapted to impose a standard test weight on said weighing mechanism equivalent to said given loading, and selector means for selecting an operating condition of the feeder with said control means operatively connected to said supply means controlling same in a sense to restore said given loading or a calibrating condition of the feeder with said control means operatively connected to control the balance setting of said weighing mechanism.

10. A gravimetric feeder as defined in claim 9 further including means to adjust the length of said weigh span.

11. A gravimetric feeder as defined in claim 9 further including means to adjust the vertical position of said weight sensing means.

12. A method for calibrating a gravimetric feeder including a belt, controllable supply means to introduce material onto said belt, means defining a weigh span, means to advance said belt past said supply means and then over said weigh span, a weighing mechanism preset to balance at a given loading including weight sensing means contacting the underside of said belt within the limits of said weigh span to load said weighing mechanism, said weight sensing means being in the plane of said weigh span at said given loading, and means actuated responsive to said weighing mechanism sensing deviations from said given loading to control said supply means in a sense to restore said given loading comprising the steps of clearing material from the portion of the belt over the weigh span, imposing standard test weights equivalent to the given loading on the weighing mechanism and resetting the weighing mechanism to balance with the standard test weights imposed and then removing the standard test weights.

13. The method for calibrating a gravimetric feeder as defined in claim 12 including the further step of adjusting the vertical position of the weight sensing means prior to performing the steps enumerated in claim 12.

14. The method for calibrating a gravimetric feeder as defined in claim 12 including the further step of adjusting the length of the weigh span to correlate same with belt advance prior to performing the steps enumerated in claim 12.

15. A gravimetric feeder comprising a belt, controllable supply means to introduce material onto said belt, means defining a weigh span, drive means to advance said belt past said supply means and then over said weigh span with a portion of said belt spanning said weigh span, a weighing mechanism preset to balance at a given loading including weight sensing means contacting the underside of said belt within the limits of said weigh span to sense the weight of said belt and material thereon and to load said weighing mechanism, said weight sensing means being positioned in the plane of said weigh span at said given loading, control means to control the output from said supply means, sense means to provide an output signal corresponding to a predetermined advance of said belt, means to adjust the length of said weigh span to equal exactly a whole number multiple of said predetermined advance, sampling means actuated in response to said output signal for sampling the condition of said weighing mechanism, and means actuated responsive to the condition of said weighing mechanism as determined by said sampling means for initiating said control means to impose a correction on said supply means to control the output from said supply means in a sense to restore said given loading.

16. A gravimetric feeder comprising a belt, controllable supply means to introduce material onto said belt, means defining a weight span, drive means to advance said belt past said supply means and then over said weigh span with a portion of said belt spanning said weigh span, a weighing mechanism preset to balance at a given loading including weight sensing means contacting the underside of said belt within the limits of said weigh span to sense the weight of said belt and material thereon and to load said weighing mechanism, said weight sensing means being positioned in the plane of said weigh span at said given loading, control means to control the output from said supply means, initiating means operative at intervals, sampling means actuated in response to said initiating means operative once during each interval for sampling the condition of said weighing mechanism, and means actuated responsive to the condition of said weighing mechanism as determined by said sampling means for instigating said control means to impose a correction at a fixed rate and for a fixed time unrelated to belt advance on said supply means to control the output from said supply means in a sense to restore said given loading.

17. A gravimetric feeder comprising, a pressure tight housing having an inlet at the top of one end and an outlet at the bottom of the other end, a head pulley mounted in proximity with said outlet, means for driving said head pulley, a tail pulley mounted in proximity with said inlet, said pulleys having parallel axes, tail pulley mounting means for moving said tail pulley normal to its own axis, an endless belt engaging said head and tail pulleys and driven thereby, means defining a weigh span between said head and tail pulleys over which the upper part of said belt travels, a weighing mechanism sensing the weight of said belt and material thereon as it traverses said weigh span and to provide an indication thereof, an arm pivotally mounted at one end with respect to said housing, a tension pulley rotatably mounted on the other end of said arm and contacting the lower course of said belt from above with the weight of said tension pulley biasing said belts downwardly, indicating means to indicate visually the vertical positions of said tension pulley with respect to a point of reference on said housing, a viewing port defined by said housing enabling inspection of said indicating means, an adjustment mechanism operatively engaging said mounting means for said tail pulley the actuation of which moves said tail pulley toward and away from said head pulley, said adjustment mechanism adapted to be actuated from the outside of said housing, whereby the displacement of the lower course of said belt and said tension pulley are moved vertically and whereby said viewing port and said indicating means allow for fine vertical adjustments of said tension pulley.

18. A pulverulent bulk material feeder which during operation is required to be maintained in a gas-tight condition preventing access for cleaning and wherein there exists a tendency for tramp material to accumulate comprising a gas-tight housing having an inlet at the top and an outlet at the bottom, a primary conveyor including a belt mounted in the housing, means to advance said belt, weighing means to sense the weight of said belt and material thereon, means actuated responsive to said weighing mechanism, and a secondary conveyor position below said primary conveyor and in operative relation with respect to the floor of said housing for cleaning out tramp material accumulating on the floor of said housing by transporting said tramp material along the floor to said outlet and discharging same therethrough.

19. A gravimetric feeder comprising a housing having an inlet in the top and an outlet in the bottom, a conveyor belt mounted in said housing, means defining a weigh span, means to advance said belt over said weigh span with a portion of said belt spanning same, weighing means positioned to contact the underside of said belt within the limits of said weigh span and to sense the weight of said belt and material thereon, means actuated responsive to said weighing mechanism to provide an indication of the weight sensed by said weighing mechanism, and a cleanout means operative against the floor of said housing to transport material on the floor to the outlet and discharge same through the outlet, wherein the floor of said housing is built as a flat surface and said cleanout means comprises a chain scraper conveyor.

20. A gravimetric feeder as set forth in claim 19 wherein said housing is a cylindrically shaped, pressure shell, and wherein the floor thereof comprises a flat plate attached to the interior wall of said shell which defines therewith a void, said void being completely filled with an incompressible material.

21. A gravimetric feeder comprising a cylindrically shaped, pressure housing having an inlet in the top and an outlet in the bottom, a conveyor belt mounted in said housing, means defining a weigh span, means to advance said belt over said weigh span, weighing means for sensing the weight of said belt and material thereon, indicating means responsive to said weighing means, a plate attached to the interior wall of said shell defining at least a portion of the floor of said housing and defining with said shell an enclosed void, and incompressible material filling said void.

22. A pressure vessel adapted to meet predetermined pressure requirements comprising, an outer pressure shell of practical geometrical design to meet the predetermined pressure requirements, internal sheet partitioning means attached to the interior wall of said pressure shell subdividing the interior of said pressure shell into two isolated spaces, one of said spaces being of a predetermined shape such that heavy reinforcement of said partitioning means would normally be required to meet the pressure requirements, and incompressible material filling the other of said spaces, so that the pressure shell effectively takes all forces required to contain the pressure differential, obviating the need for heavy reinforcement, and the partitioning means can be of lesser structural strength than said pressure shell.

23. A pressure vessel as defined in claim 22 wherein said material is selected from the group consisting of concrete, sand, water, and oil.

24. A method of equally stressing the wall of a pressure vessel comprising providing a gas-tight pressure shell of sufficient shape to withstand stresses from a pressure differential, providing a plate with very little structural reinforcement in said pressure shell for defining two isolated compartments of irregular shape, filling one of the compartments with incompressible material, creating a fluid pressure differential between the other compartment and the outside of the vessel, transferring the stress forces resulting from the pressure differential to the entire pressure shell whereby substantially no stress due to the pressure differential is felt in the slightly reinforced plate.

25. The gravimetric feeder as set forth in claim 7, wherein said weigh span comprises a pair of spaced weigh span rollers and wherein said means to adjust the length of said weigh span comprises bearing housings fixedly supported and bearings eccentrically located inside said weigh span rollers.

26. The gravimetric feeder as set forth in claim 10, wherein said weigh span comprises a pair of spaced weigh span rollers and wherein said means to adjust the length of said weigh span comprises bearing housings fixedly supported and bearings eccentrically located inside said weigh span rollers.

27. The gravimetric feeder as set forth in claim 15, wherein said weigh span comprises a pair of spaced weigh span rollers and wherein said means to adjust the length of said weigh span comprises bearing housings fixedly supported and bearings eccentrically located inside said weigh span rollers.

References Cited by the Examiner

UNITED STATES PATENTS

| | | | |
|---|---|---|---|
| 207,626 | 9/78 | Sargent | 198—202 |
| 1,100,406 | 6/14 | Spadone | 198—201 |
| 1,125,705 | 1/15 | Messiter | 222—55 X |
| 1,224,384 | 5/17 | Kaukaine | 198—208 X |
| 1,582,323 | 4/26 | Warren | 198—208 X |
| 2,088,334 | 7/37 | Merchan | 222—55 |
| 2,161,402 | 6/39 | Arutunoff. | |
| 2,447,594 | 8/48 | Petersen | 222—55 |
| 2,559,616 | 7/51 | Hapman | 198—204 X |
| 2,622,766 | 12/52 | Simon | 222—55 |
| 2,636,502 | 4/53 | Buechel | 222—273 |
| 2,639,802 | 5/53 | Duncan | 198—203 |
| 2,708,503 | 5/55 | Arnold | 222—55 X |
| 2,869,714 | 1/59 | Williams | 198—213 |
| 2,928,536 | 3/60 | Weaver et al. | 206—46 |
| 3,044,607 | 7/62 | Hopper | 206—46 |
| 3,070,261 | 12/62 | Smalley | 222—55 |

RAPHAEL M. LUPO, *Primary Examiner.*